(12) United States Patent
Katayama et al.

(10) Patent No.: US 7,657,055 B2
(45) Date of Patent: Feb. 2, 2010

(54) IMAGE PROCESSING METHOD AND IMAGE GENERATING APPARATUS

(75) Inventors: Akihiro Katayama, Kanagawa (JP); Kuniyasu Yamanaka, Tokyo (JP); Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 10/900,175

(22) Filed: Jul. 28, 2004

(65) Prior Publication Data

US 2005/0024507 A1   Feb. 3, 2005

(30) Foreign Application Priority Data

Jul. 31, 2003   (JP)   ............... 2003-204669

(51) Int. Cl.
*G06K 9/00*   (2006.01)
*G06T 17/00*   (2006.01)

(52) U.S. Cl. ................. 382/100; 382/154; 345/420

(58) Field of Classification Search ........... 382/154, 382/100; 345/420
See application file for complete search history.

(56) References Cited

U.S. PATENT DOCUMENTS

| | | | |
|---|---|---|---|
| 6,219,435 B1 * | 4/2001 | Horikoshi et al. | 382/100 |
| 6,256,035 B1 | 7/2001 | Katayama et al. | 345/419 |
| 6,268,862 B1 | 7/2001 | Uchiyama et al. | 345/427 |
| 6,269,170 B1 * | 7/2001 | Horikoshi et al. | 382/100 |
| 6,356,272 B1 * | 3/2002 | Matsumoto et al. | 345/582 |
| 6,445,807 B1 * | 9/2002 | Katayama et al. | 382/100 |
| 6,836,286 B1 | 12/2004 | Tachi et al. | 348/36 |
| 6,847,371 B2 * | 1/2005 | Matsumoto et al. | 345/582 |
| 7,035,453 B2 * | 4/2006 | Liu | 382/154 |
| 7,079,680 B2 * | 7/2006 | Baumberg | 382/154 |
| 7,085,409 B2 * | 8/2006 | Sawhney et al. | 382/154 |
| 7,106,348 B2 * | 9/2006 | Matsumoto et al. | 345/640 |
| 7,149,345 B2 * | 12/2006 | Fujiwara | 382/154 |
| 7,253,832 B2 * | 8/2007 | Iwaki et al. | 348/50 |
| 7,298,890 B2 * | 11/2007 | Massen | 382/154 |

FOREIGN PATENT DOCUMENTS

| | | | |
|---|---|---|---|
| GB | 2358540 A | * | 7/2001 |
| JP | 10-27268 | | 1/1998 |
| JP | 10-97642 A | | 4/1998 |
| JP | 10-327431 | | 12/1998 |
| JP | 2003-202216 | | 7/2003 |

OTHER PUBLICATIONS

Zhang, Zhengyou, "Modeling Geometric Structure and Illumination Variation of a Scene from Real Images", Jan. 1998, Sixth International Conference on Computer Vision, pp. 1041-1046.*

* cited by examiner

*Primary Examiner*—Wenpeng Chen
*Assistant Examiner*—Soo Jin Park
(74) *Attorney, Agent, or Firm*—Fitzpatrick, Cella, Harper & Scinto

(57) ABSTRACT

An image processing method for reconstructing an image of an arbitrary view point from plural photographed images, for the purpose of reducing a memory capacity for storing photographed images in an image generating apparatus capable of generating an image of an arbitrary view point, the method including a setting step of setting a view point position, an input step of inputting photographed images, and an extraction step of extracting light beam data necessary for reconstructing an image at the set view point position from the photographed images, wherein the input step and the extraction step are repeated until the reconstructed image is generated.

8 Claims, 31 Drawing Sheets

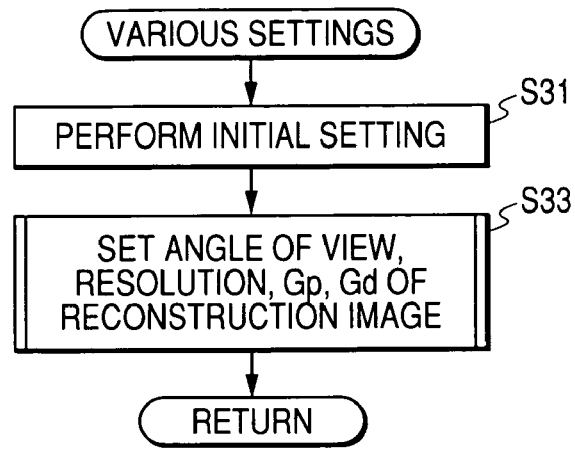
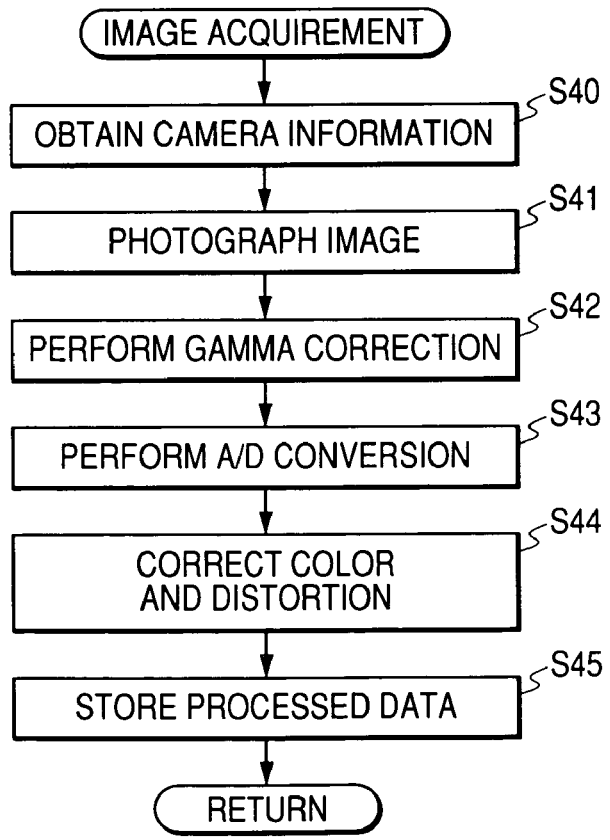

FIG. 6

REFERENCE COORDINATE SYSTEM: ALREADY SET
ORIENTATION: (10, 30, 60)
VIEW POINT POSITION: (50, 40, 90) cm
THE NUMBER OF PIXELS: XGA
ANGLE OF VIEW: 60°

IMAGE PROCESSING METHOD AND IMAGE GENERATING APPARATUS

This application claims priority from Japanese Patent Application No. 2003-204669 filed Jul. 31, 2003, which is hereby incorporated by reference herein.

BACKGROUND OF THE INVENTION

1. Field of the Invention

The present invention relates to an apparatus for reconstructing an image of an arbitrary view point (or an arbitrary point of view (POV)) from plural photographed images.

2. Related Background Art

There have been attempts to generate an image of an arbitrary view point from photographed images. For example there is employed a method of determining a shape of an object from two or more images utilizing a stereo measurement, and generating an image of an arbitrary view point by a computer graphics (CG) technology. In such method, however, it is necessary to identify corresponding points in two or more images, and such operation is very difficult under certain conditions thereby resulting in a low image quality of a generated image. In contrast, an image-based rendering (IBR) technology, particularly a method of obtaining a light beam coming into the space and generating an image of an arbitrary view point utilizing such beam, has an advantage capable in principle of generating a proper image of an arbitrary view point by measuring a position and an orientation (or posture) of a camera at an image pickup (image being a record of a ray passing through a lens of the camera).

FIG. 31A is a schematic view showing a CCD camera in a state of image pickup of an object. An ordinary image pickup plane is a CCD, but, for the simplicity of explanation, an imaginary plane folded back symmetrically with respect to a center of a lens is assumed as an image pickup plane, and, for further simplifying the explanation, the image pickup plane is assumed to be constituted of a one-dimensional line sensor. As shown in FIG. 31B, in case a multi view point image can be obtained at an arbitrary view point on a line L, a color of a pixel i of an image observable at a view point position Q is same as a color of a pixel i' of an image having a view point position at a crossing point R of a line connecting the pixel i and the view point position Q and the line L. It is thus possible to reconstruct an image at a completely new view point position at which the image pickup has not been made, by determining such relationship for all the pixels of the image to be reconstructed. In "Light Field Rendering" (M. Levoy and P. Hanrahan, Proc. SIGGRAPH 96, p. 31-42, 1996), which is a representative example of such method, the light beams are acquired by photographing images with cameras positioned in lattice points as shown in FIG. 32.

In the aforementioned method, however, since image are taken in advance at plural view point positions for obtaining the light beams, then such images are once stored in a storage apparatus and are used for generating an image at an arbitrary view point, it is necessary to secure a storage area for storing plural images. Also since the number of the photographed images affects the image quality of the image of the arbitrary view point to be generated, it is necessary to take a large number of images for obtaining a high-quality image, so that a recording apparatus for storing the photographed images also requires an enormous capacity. Such situation may be tolerated in an equipment connectable to a recording apparatus of a large capacity such as a personal computer, but constitutes a major difficulty in an equipment such as a compact digital camera, since the storage capacity is limited.

Also in case of an image pickup apparatus such as a digital camera utilizing the image-based rendering technology, after an image reconstruction is started by a depression of a start button by the user, it is not possible to recognize a current situation or to understand when the process will be terminated, whereby the user may feel stressed.

SUMMARY OF THE INVENTION

The present invention has been made in consideration of the foregoing and is to reduce a storage capacity to be used for image pickup.

Another object of the present invention is to reduce a stress of the user.

The aforementioned objects can be attained, according to the present invention, by a following configuration.

An aspect described in Claim 1 of the present invention is an image processing method for reconstructing an image of an arbitrary view point from plural photographed images including a setting step for setting a view point position, an input step for inputting photographed images, and an extraction step for extracting light beam data necessary for reconstructing an image at the set view point position, wherein the input step and the extraction step are repeated until the reconstructed image is generated.

Also an aspect described in Claim 8 of the present invention is an image processing method for reconstructing an image of an arbitrary view point from plural photographed images including a setting step for setting a view point position, an input step for inputting photographed images, an extraction step for extracting light beam data necessary for reconstructing an image at the set view point position, and a display step for displaying an image in the course of reconstruction on a display.

Still other objects of the present invention will become fully apparent from following description to be taken in conjunction with accompanying drawings.

BRIEF DESCRIPTION OF THE DRAWINGS

FIG. 3 is a flow chart showing a content of various settings in the first embodiment;

FIG. 4 is a flow chart showing an image obtaining process in the first embodiment;

FIG. 6 is a view showing information set in a step S33;

DETAILED DESCRIPTION OF THE PREFERRED EMBODIMENTS

First Embodiment

In the following, a photographing apparatus constituting a first embodiment of the present invention will be explained in detail, with reference to accompanying drawings.

Figure 1:
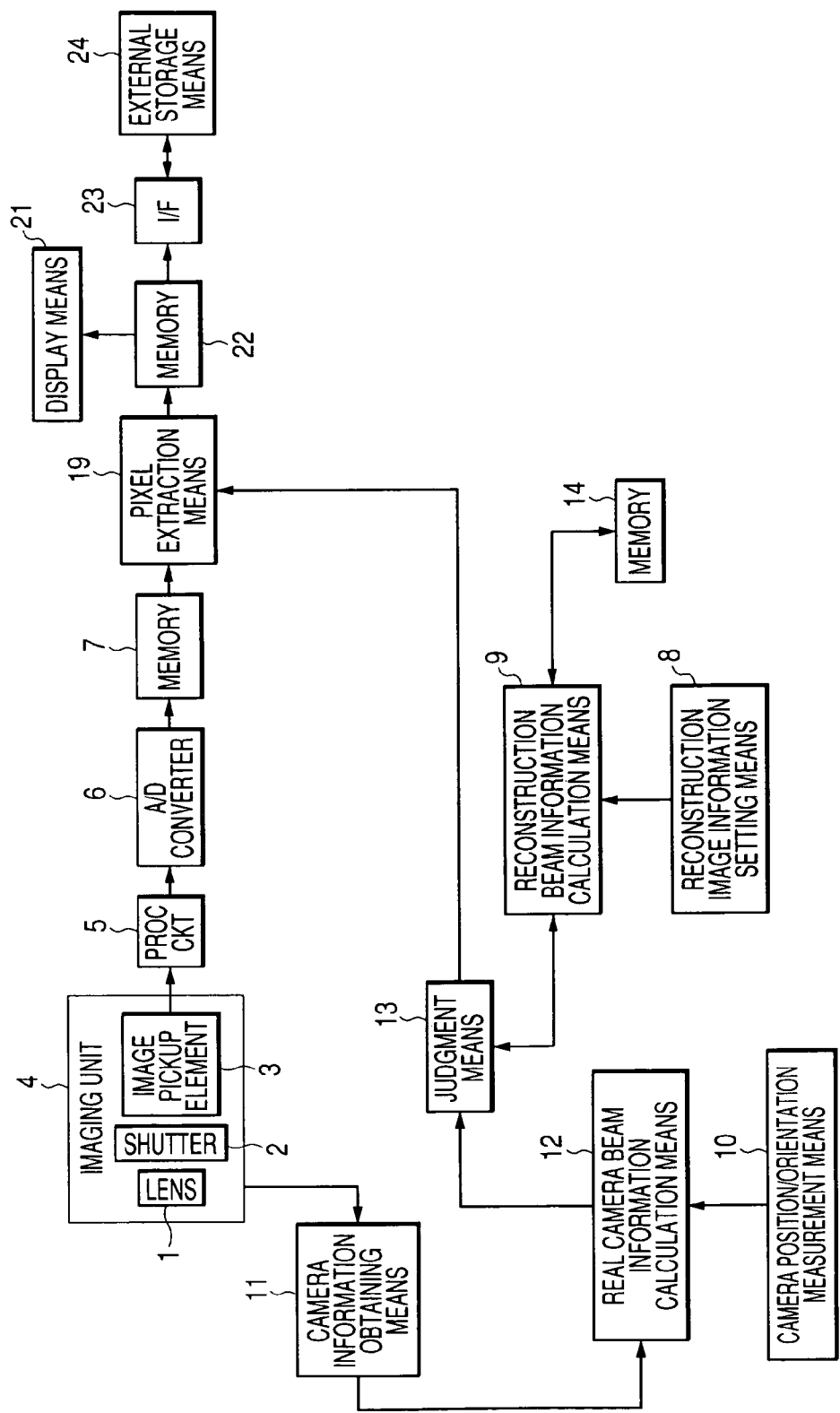
FIG. 1 is a block diagram showing configuration of a first embodiment.

FIG. 1 is a block diagram of a photographing apparatus of the first embodiment.

Referring to FIG. 1, there are shown a photographing lens 1; a shutter 2 provided with a diaphragm function; an image pickup element 3 for converting an optical image into an electrical signal for example by a CCD; a part of an imaging unit 4 including a lens, a diaphragm, an image pickup element etc.; a process circuit 5 for executing a known camera signal process such as a gamma correction; an A/D converter 6 for converting an analog output of the process circuit 5 into a digital signal; a memory 7 for storing image data outputted from the A/D converter 6; a reconstruction image information setting means 8 for setting information of a reconstruction image; a reconstruction beam information calculation means 9 for calculating and holding beam information required for reconstruction from information of the reconstruction image information setting means 8, deleting beam information informed from a judgment means 13 from the held beam information and outputting the held beam information to a memory 14; a camera position/orientation measurement means 10 for measuring a position and an orientation of the camera; camera information obtaining means 11 for obtaining information (image angle of photographed area, pixel number of image pickup element etc.) of a photographing camera; a real camera beam information calculation means 12 for calculating beam information obtained by the camera, based on information of the camera information obtaining means 11 and that of the camera position/orientation measuring means 10; the judgment means 13 for judging whether the beam information outputted by the reconstruction beam information calculation means 9 is included in the beam information outputted by the real camera beam information calculation means 12, and, in case of an inclusion even partially, transmitting such included beam information to a pixel extraction means 19 and reconstruction beam information calculation means 9; the memory 14 for storing the information of the reconstruction beam information calculation means 9; a memory 22 for recording information of the pixel extraction means 19; a display means 21 for displaying information of the memory 22; an interface 23 for exchanging information stored in the memory 22 with an external memory apparatus (a hard disk, CompactFlash™, another external memory, or a recording medium such as a hard disk or a memory card); and an external storage means 24 such as a hard disk, a memory card, a CD or a DVD. These components are controlled by a not-shown controller.

Figure 2:
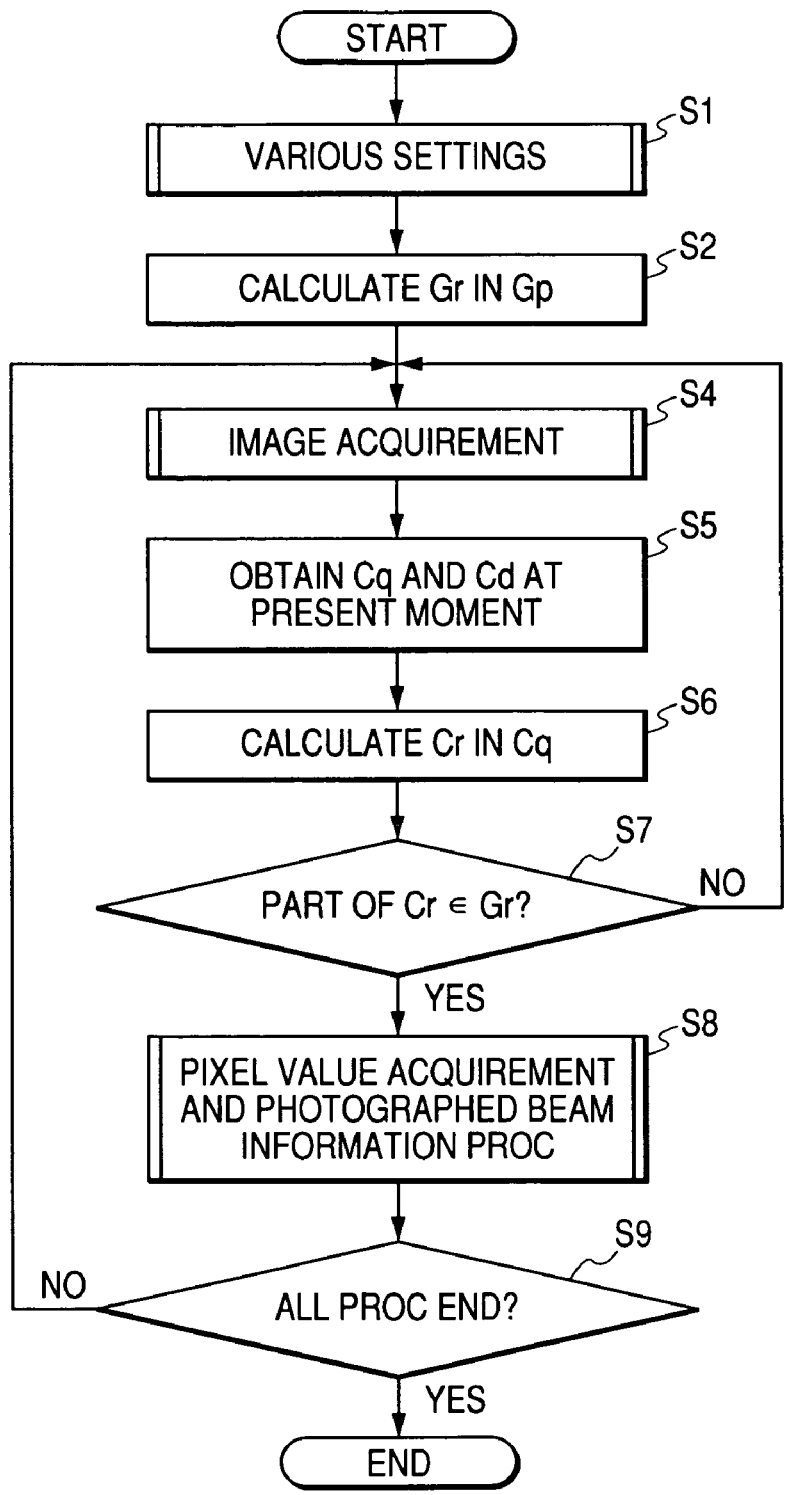
FIG. 2 is a flow chart showing a process flow in the first embodiment.

FIG. 2 is a flow chart showing a process flow of the present embodiment. A step S1 executes various initializations relating to photographing, and a step S2 calculates beam information Gr in a position Gp and an orientation Gd for reconstruction. The beam information Gr is represented, among beams passing through the position Gp, by an assembly of straight lines determined by a view angle and a pixel number of the set reconstruction image. A straight line (beam) $L_{ij}$ in a three-dimensional space is given, for a view point position $Gp=(x_p, y_p, z_p)$ and a position $E_{ij}=(x_{ij}, y_{ij}, z_{ij})$, by:

$$\frac{x - x_p}{x_{ij} - x_p} = \frac{y - y_p}{y_{ij} - y_p} = \frac{z - z_p}{z_{ij} - z_p} \quad (1)$$

wherein $x_{ij} - x_p \neq 0, y_{ij} - y_p \neq 0, z_{ij} - z_p \neq 0$.

In the relation (1), in case denominator is zero in one of the terms, it represents a straight line on a plane defined by two axes excluding an axis relating to such term, and, in case denominators are zero in two terms, it becomes a straight line perpendicular to an axis other than the axes relating to such terms. For example, if $x_{ij} - x_p = 0$, it becomes a straight line parallel to the YZ plane, and, if $x_{ij} - x_p = y_{ij} - y_p = 0$, it becomes a straight line parallel to Z-axis. In case an image pickup plane of an imaginary camera has N pixels in total, there exist N straight lines. Each pixel position on the image pickup plane of the imaginary camera can be calculated as a relative position to an optical center (view point position of the reconstructed image) once an orientation of the imaginary camera, a view angle of the imaginary camera, a number of pixels in the image pickup plane thereof, and a size of a pixel are known. Method of determining such view point and pixel position will be explained later. Then a step S4 executes an actual photographing of an image. A step S5 obtains a view angle and a pixel number of the camera and a position Cq and an orientation Cd of the camera at the photographing in the step S4, and a step S6 calculates a position Cq and pixel positions on the image pickup plane. A step S7 compares beam information Cr (straight line represented by the view point position and the pixel positions on the image pickup plane) obtained by the camera, with Gr, and in case Cr is included even partially in Gr, the sequence proceeds to a step S8, but, in case it is not at all included, the sequence returns to the step S4. Whether a part of the beam group Cr is included in Gr can be judged by substituting the view point position and each pixel position on the image pickup plane, obtained in the step S6, into each straight line Gr given by the relation (1) and identifying whether such relation is satisfied. An inclusion (coinciding beam) or a non-inclusion is identified respectively if the relation is satisfied or not. A step S8 obtains a color (pixel value) of the beam of Cr included in Gr and processes the already photographed beam information. A step S9 terminates the process in case the pixel value has been specified for all the pixels constituting an image to be reconstructed, but, if not, the sequence returns to the step S4 to repeat the aforementioned process. This serial process allows to obtain a reconstruction image. In comparison with the prior technology requiring storage means of a large capacity for obtaining a reconstruction image, this process, by photographing an image, extracting and storing necessary pixel values only in another memory, provides an advantage that the memory 7 requires a capacity of only one image.

FIG. 3 is a flow chart showing various setting processes. A step S31 provides various information on photographing as initialization values. This is similar to an initialization in an ordinary digital camera, such as setting of an output bit number of the pixel value, a diaphragm value, and a shutter speed. It is also possible to set a view angle and a pixel number for a camera in which the view angle and the pixel number are fixed, though such setting is unnecessary in the present embodiment since the camera information such as the view angle and the pixel number is obtained at each image acquisition.

FIG. 4 is a flow chart showing a process flow of an image obtaining process S4. A step S40 obtains information such as a view angle of a camera used for photographing and a pixel number of an image pickup unit. In case the view angle and the pixel number do not change during photographing, the view angle and the pixel number given at the initialization may be used. In such case, this step may be dispensed with. Then a step S41 photographs an image, then a step S42 executes a gamma correction process, a step S43 executes an A/D conversion, a step S44 executes corrections for color and distortion, and a step S45 stores corrected digital data in a buffer memory inside the camera.

Figure 5:
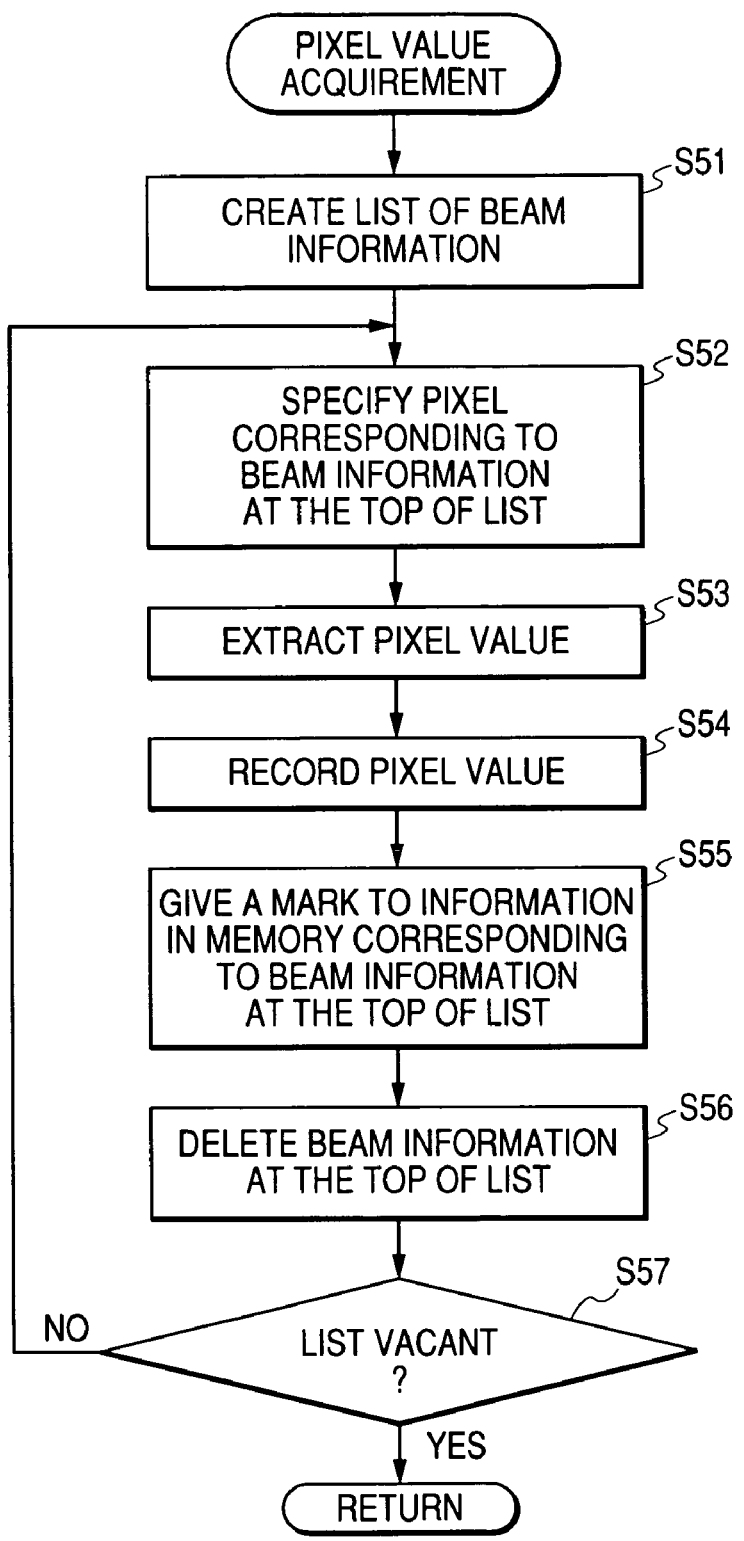
FIG. 5 is a flow chart showing an image value obtaining process in the first embodiment.

FIG. 5 is a flow chart showing a flow of a pixel value obtaining process S8. At first a step S51 forms a list of the beam information, among the beam information Cr, included in Gr (beam coinciding with the beam in Gr). Then a step S52 specifies a pixel in a photographed image corresponding to the beam information at the top of the list, and a step S53 extracts a pixel value of such pixel. A step S54 stores such pixel value in a corresponding position in the memory 22 (for example, in case the considered beam corresponds to a pixel (i, j) in the reconstructed image, in an area of the memory 22 corresponding to a pixel (i, j) of the reconstructed image). A step S55 gives a mark to the obtained pixel, in order that the already obtained beam information can be identified among the beam group required for reconstruction. This can be achieved for example by recording a pixel with 4 bytes, and assigning 3 bytes to the pixel value (RGB) and 1 byte to identification information, in which such mark can be provided. After the above process, the beam information at the top of the list is deleted, and next beam information is processed. In case the next beam information is not existing (step S57), the pixel value obtaining process is terminated, whereupon the sequence returns to a step S9 of the main routine. Otherwise, the sequence returns to the step S52.

In the step S51 for forming the list of the beam information included in Gr, the memory 22 is referred to and the already obtained beam (bearing a mark in the corresponding position of the memory) is excluded. Otherwise, it is also possible to form beam information Hr by excluding already obtained information from the beam information Gr necessary for reconstruction and to use such beam information Hr in the comparison with Cr, thereby improving efficiency by avoiding duplicated determination of the beam.

The above process allows to extract beam (pixel) information contained in an image photographed at a certain time and necessary for image reconstruction.

Figure 7:
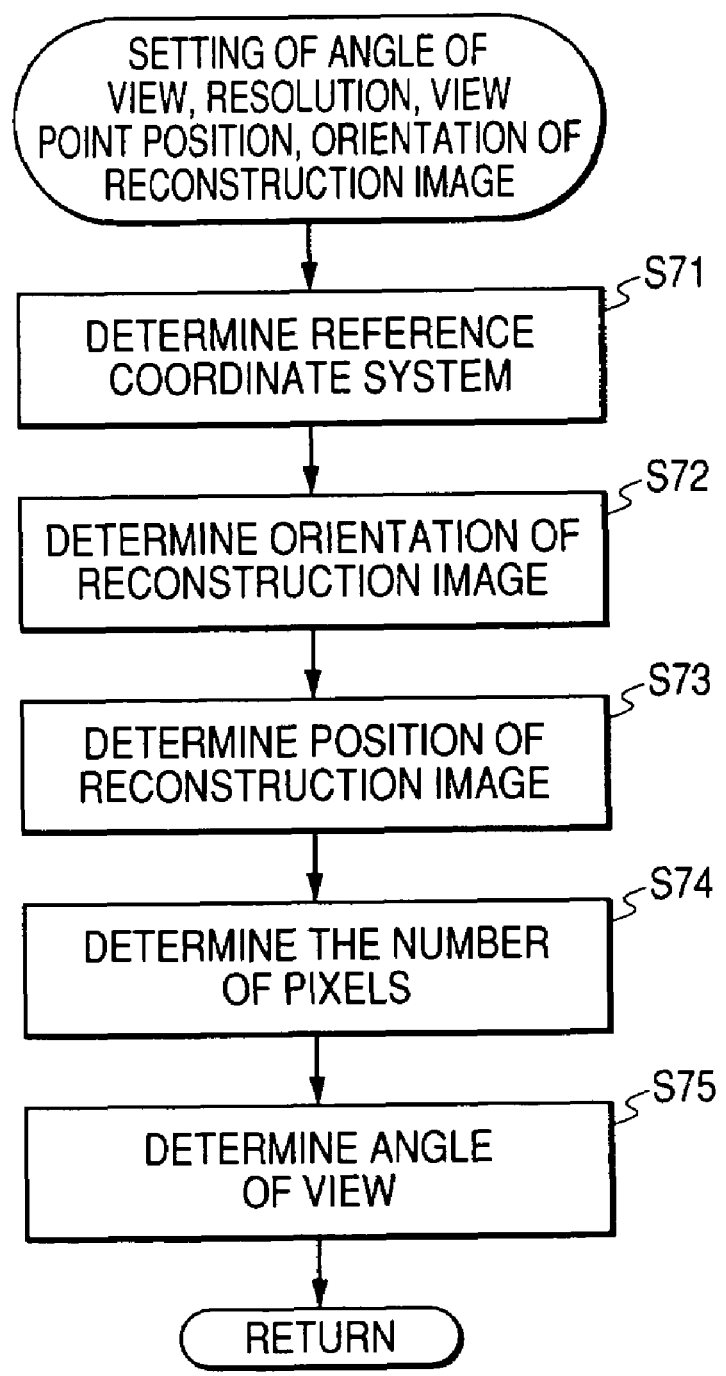
FIG. 7 is a flow chart showing a process flow for setting a reference coordinate system, an orientation of reconstruction image, a view point position, a pixel number and an image angle.
Figure 8:
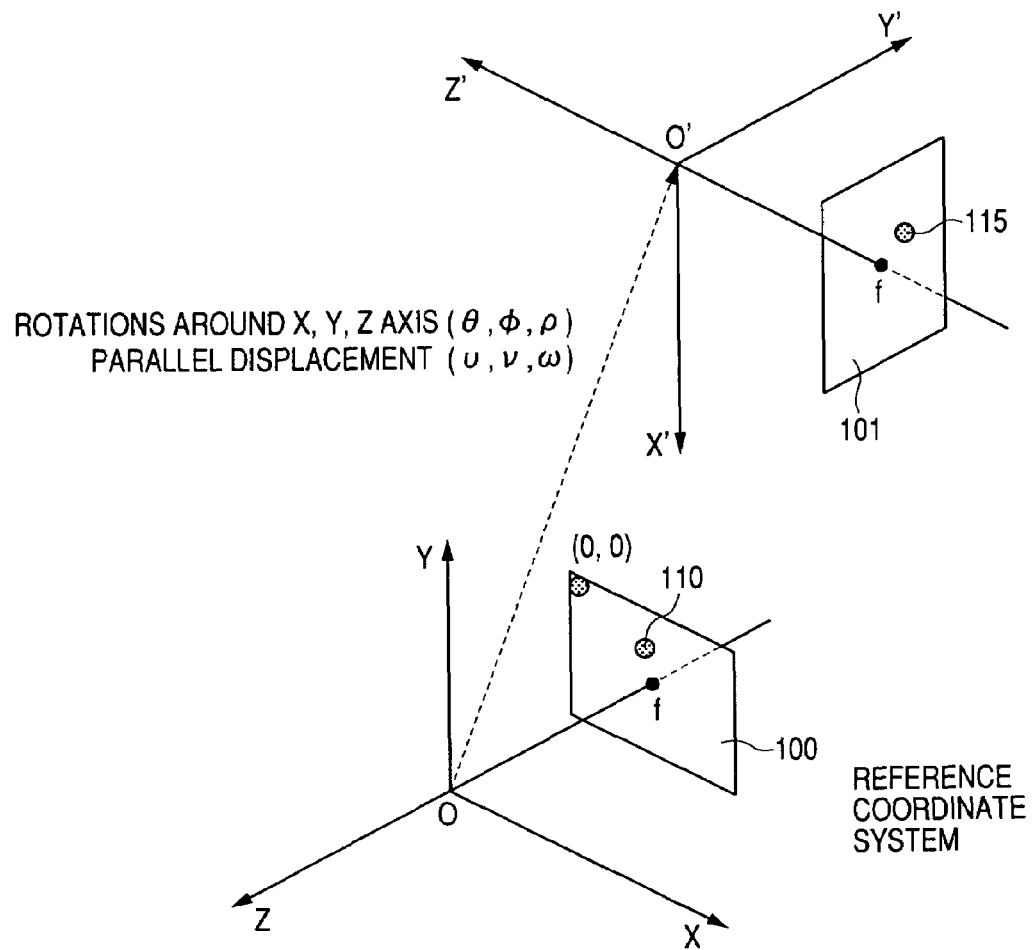
FIG. 8 is a view showing a rotation and a parallel displacement of a coordinate system.

FIG. 6 shows information to be set in the step S33. The information set in the step S33 includes five items, namely a reference coordinate system, an orientation of the reconstructed image, a view point position, a pixel number and an angle of view. The setting of such information will be explained with reference to FIG. 7. The camera is provided internally or externally with a position/orientation sensor which outputs relative position and orientation, from time to time, with respect to the position and orientation at such time. At first a step S71 sets a reference coordinate system. A reference coordinate system setting button is provided, and in response to a depression thereof, there is set a reference coordinate system having an original point at the optical center of the camera at such time of depression, a Z-axis along the optical axis of the camera, an X-axis and a Y-axis respectively in the lateral and vertical directions of an image pickup plane (CCD) of the camera. Such state is shown in FIG. 8. The image pickup plane exists behind the optical center (original point) O in an actual camera, but an imaginary image pickup plane 100 is assumed in a position folded back with respect to the original point O. This is a method of expression often employed in computer graphics or computer vision, and generality is maintained in such expression. After the setting of the reference coordinate system, a text or a mark "setting done" is displayed in a reference coordinate system column as shown in FIG. 6, in order to clarify that the setting is completed. Once the reference coordinate system is set, the sensor incorporated in the camera outputs position and orientation relative to the reference coordinate system. Then a step S72 sets an orientation of a reconstruction image. Since the sensor incorporated in the camera outputs position/orientation information relative to the reference coordinate system, by changing the camera orientation to a desired orientation and depressing a setting button in an orientation determination mode for the reconstruction image, the orientation on the reference coordinate system is determined and a value thereof is displayed in a "orientation" column. The orientation of the reconstruction image is expressed, assuming that the reference image pickup place is present at z=−f, by amounts of rotation to the axes (X, Y, Z) of the reference coordinate system. For example, FIG. 8 shows that an orientation of the reconstruction image can be assumed by rotations ($\theta$, $\phi$, $\rho$) respectively about the axis of the reference coordinate system. Then a step S73 sets a view point position of the reconstruction image. This is achieved by directly inputting a distance from the original point of the reference coordinate system. In the present example, it is assumed that (u, v, w) are inputted as X, Y and Z values of the reference coordinate system. In consideration of a reconstruction image coordinate system (a coordinate system similar to the reference coordinate system but having an original point at the optical center of the imaginary camera), the position and the orientation thus provided correspond to amounts of parallel displacement and rotation for matching the reference coordinate system with the reconstruction image coordinate system. A step S74 sets a pixel number (resolution). The pixel number is selected for example from "VGA", "XGA", "SXGA", ..., "others". In case "others" is selected, a pixel number is directly entered. Thereafter, a step S85 sets an angle of view. Also for the angle of view, representative values are made selectable as in the case of pixel number, and an arbitrary number may be entered only in case "others" is selected. Horizontal and vertical angles are selectable for the angle of view, but, by determining either one of the horizontal and vertical angles, the other angle is automatically determined in case an aspect ratio of a pixel of the CCD and pixel numbers in the vertical and lateral directions are known. Therefore, a horizontal angle of view alone is set in the present example.

FIG. 8 is a view showing a method of determining each pixel position when the camera is rotated by $(\theta, \phi, \rho)$ and parallel displaced by $(u, v, w)$ relative to the axes $(X, Y, Z)$. At the setting of the reference coordinate system, the image pickup plane 100 of the camera is positioned at $z=-f$ (f being focal length). For vertical and lateral sizes p, q of a pixel, vertical and lateral view angles $\omega_x$, $\omega_y$ and vertical and lateral pixel numbers m, n, the position ((0, 0) being at the upper left corner) of a pixel 110 on the image pickup plane in the reference coordinate system can be represented by:

$$(x, y, z) = \left\{\left(i - \frac{m}{2} + \frac{1}{2}\right)p, \left(-f + \frac{n}{2} - \frac{1}{2}\right)q, f\right\} \quad (2)$$

Also there stand following relations:

$$f \cdot \tan\frac{\omega_x}{2} = \frac{m \cdot p}{2} \quad (3)$$
$$f \cdot \tan\frac{\omega_y}{2} = \frac{m \cdot q}{2}$$

Therefore, the equation (2) can be rewritten as (4):

$$(x, y, z) = \left\{\frac{f}{m}(2i - m + 1)\tan\frac{\omega_x}{2}, \frac{f}{n}(-2f + n - 1)\tan\frac{\omega_y}{2}, f\right\} \quad (4)$$

Each pixel position (x', y', z') of the camera in arbitrary position and orientation can be obtained by applying a rotation and a parallel displacement to each pixel position given by (4).

Figure 9:
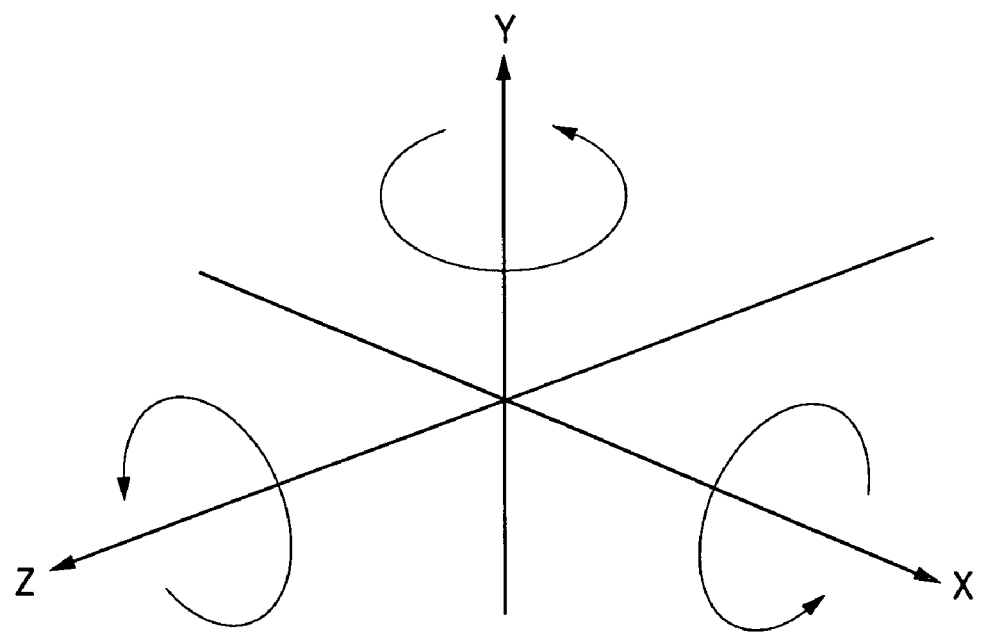
FIG. 9 is a view showing a rotating direction of coordinate axes.

Assuming a coordinate system as shown in FIG. 9, rotations $R_Z$, $R_X$ and $R_Y$ respectively about the Z, X and Y axes are represented as follows:

$$R_z = \begin{bmatrix} \cos\rho & -\sin\rho & 0 \\ \sin\rho & \cos\rho & 0 \\ 0 & 0 & 1 \end{bmatrix}$$

$$R_x = \begin{bmatrix} 1 & 0 & 0 \\ 0 & \cos\theta & -\sin\theta \\ 0 & \sin\theta & \cos\theta \end{bmatrix}$$

-continued $$R_z = \begin{bmatrix} \cos\varphi & 0 & -\sin\varphi \\ 0 & 1 & 0 \\ \sin\varphi & 0 & \cos\varphi \end{bmatrix}$$

By multiplying three rotational transformations, namely rotation about Z-axis→rotation about X-axis→rotation about Y-axis, a final rotational transformation R can be represented by:

$$R = R_z R_x R_Y = \begin{bmatrix} \cos\rho & -\sin\rho & 0 \\ \sin\rho & \cos\rho & 0 \\ 0 & 0 & 1 \end{bmatrix} \begin{bmatrix} 1 & 0 & 0 \\ 0 & \cos\theta & -\sin\theta \\ 0 & \sin\theta & \cos\theta \end{bmatrix} \begin{bmatrix} \cos\varphi & 0 & -\sin\varphi \\ 0 & 1 & 0 \\ \sin\varphi & 0 & \cos\varphi \end{bmatrix}$$

$$= \begin{bmatrix} \cos\rho\cos\varphi + \sin\rho\sin\theta\sin\varphi & -\sin\rho\cos\theta & -\cos\rho\sin\varphi + \sin\rho\sin\theta\cos\varphi \\ \sin\rho\cos\varphi - \cos\rho\sin\theta\sin\varphi & \cos\rho\cos\theta & -\sin\rho\sin\varphi - \cos\rho\sin\theta\cos\varphi \\ \cos\theta\sin\varphi & \sin\theta & \cos\theta\cos\varphi \end{bmatrix}$$

Consequently, each pixel position (x', y', z') of the camera in arbitrary position and orientation is expressed on the reference coordinate system as:

$$\begin{bmatrix} x' \\ y' \\ z' \end{bmatrix} = R \begin{bmatrix} x \\ y \\ z \end{bmatrix} + \begin{bmatrix} u \\ v \\ w \end{bmatrix}$$

Also the view point position of the camera in such state becomes (u, v, w).

As explained in the foregoing, a process of at first inputting a desired view point position, then calculating beam information necessary for reconstructing an image at such view point position and gathering such beams provides an advantage that the image reconstruction can be achieved with a smaller memory capacity than in the prior technologies.

Also a pixel position after displacement is determined by a rotation and a parallel displacement relative to a reference coordinate system, so that the determination can be achieved by simple calculations and at a higher speed.

Second Embodiment

Figure 10:
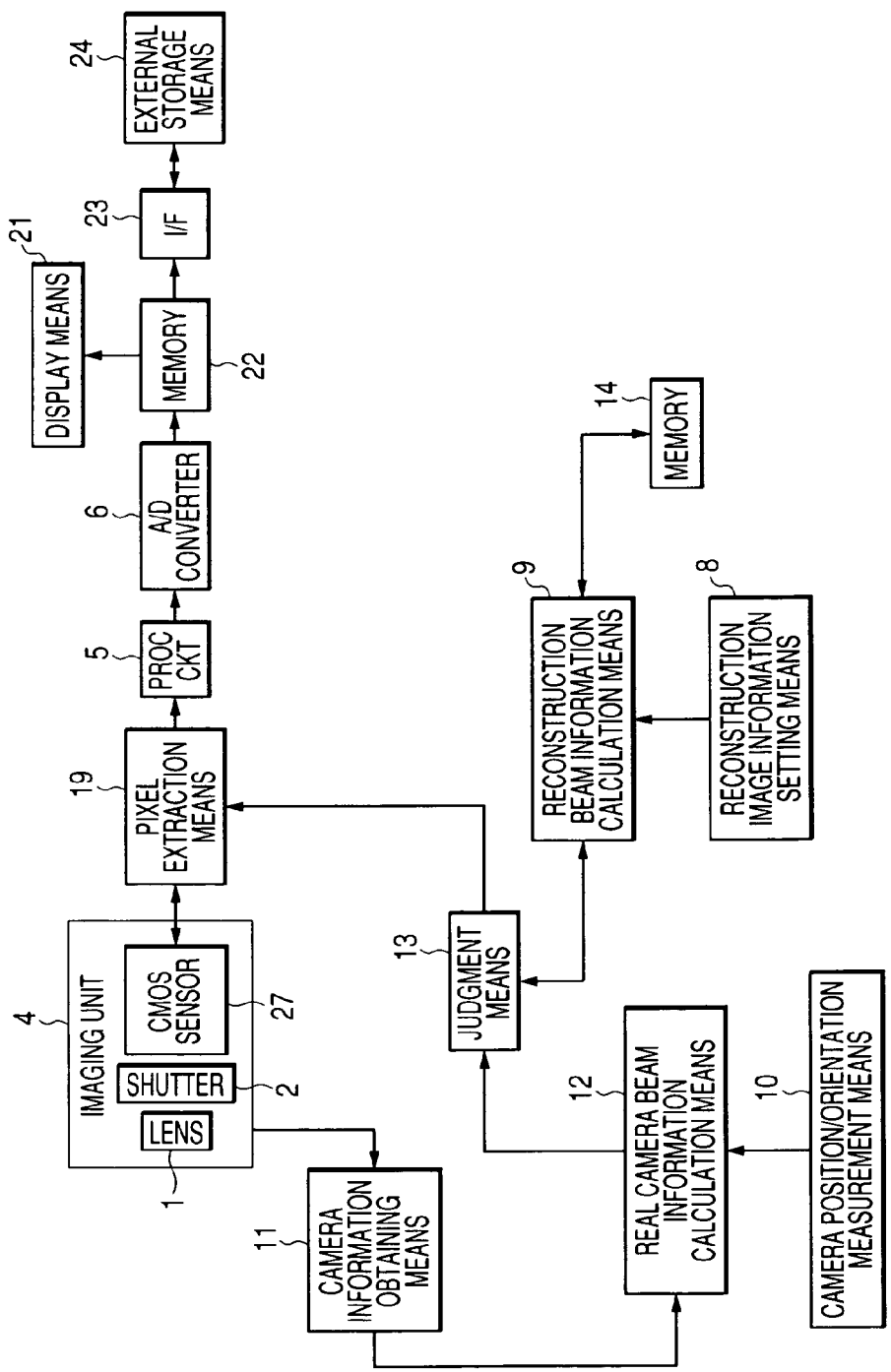
FIG. 10 is a block diagram in case an image pickup element 3 is changed from a CCD to a CMOS sensor.

FIG. 10 is a block diagram in case the image pickup element 3 is changed from CCD type to a CMOS sensor 27. In the present and ensuing embodiments, blocks represented by a same number are assumed to have a same function unless specified otherwise and will not be explained in repetition.

Since a CMOS sensor can output a pixel value independently for each pixel, it is rendered possible to output an address for directly specifying a pixel from the pixel extraction means 19 to the CMOS sensor thereby receiving a corresponding pixel value, and to store it in the memory 22 through the process circuit 5 and the A/D converter 6.

Such use of the CMOS sensor in the image pickup portion allows to dispense with a memory for temporarily storing the photographed image, thereby providing an advantage of reducing the dimension and the cost of the hardware. However the CMOS sensor is merely an example, and it is naturally possible to utilize another sensor capable of data output in the unit of each pixel.

Also use of a CCD with only one pixel as the image pickup element likewise allows to dispense with a memory for temporarily storing the photographed image as in the case of CMOS sensor, thereby also allowing to reduce the dimension and the cost of the hardware.

Third Embodiment

Figure 11:
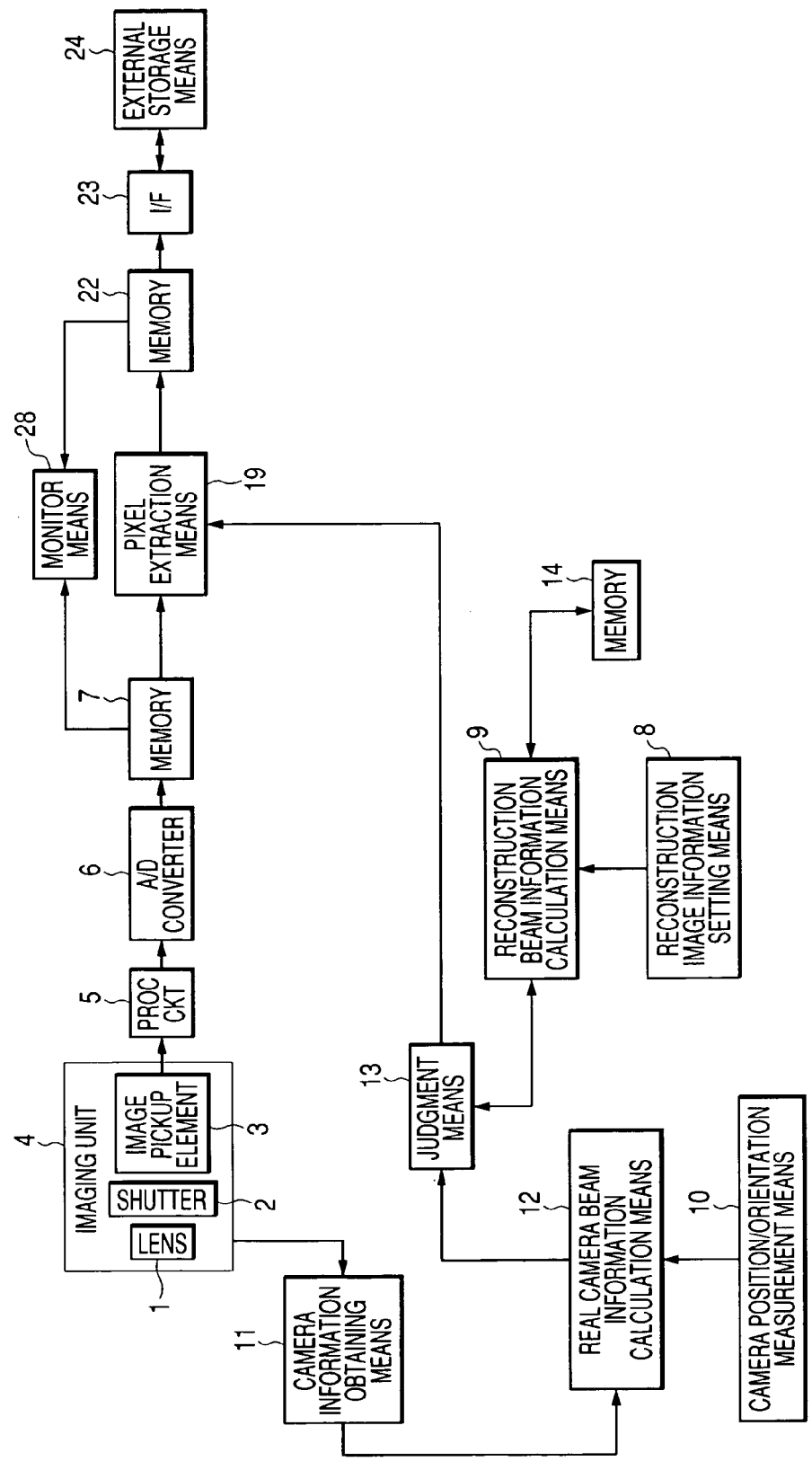
FIG. 11 is a view showing a case of adding a monitor means 28 to the first embodiment.

As the first and second embodiments are not provided with display means for displaying a reconstruction image, it is not possible, when the image reconstruction is started, to recognize the current status of image reconstruction or when the image reconstruction will be completed. Therefore, the present embodiment is provided with a monitor means 28 as shown in FIG. 11, for displaying an image under photographing and an image under reconstruction, according to a switching by the user. It is naturally possible also to provide the second embodiment with similar monitor means.

Figure 12:
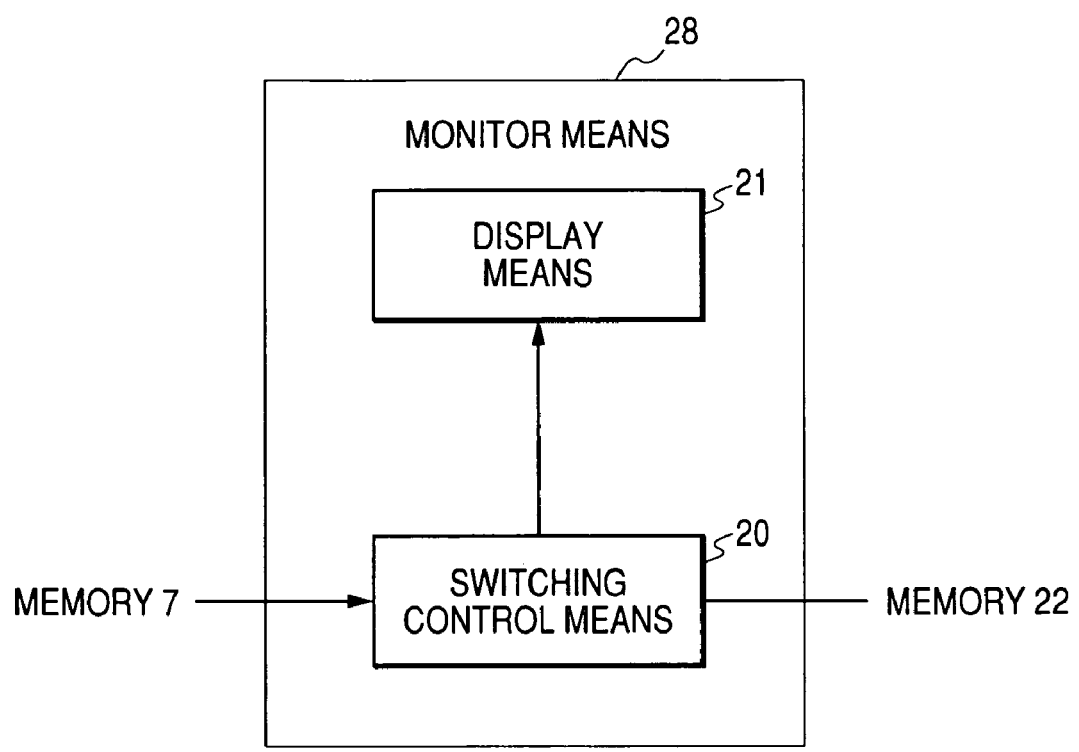
FIG. 12 is a block diagram of the monitor means 28.

FIG. 12 is a block diagram of the monitor means 28, wherein shown are a switching control means 20 for switching information stored in the memory 7 and the memory 22, and the display means 21 for visibly displaying information from the switching control means 20.

In the foregoing, a live image under photographing and an image under reconstruction are rendered switchable, but it is also possible to display the reconstruction image only. It is furthermore possible to switch the display of the image under reconstruction and the photographed image by an instruction of the user or at a predetermined interval by a timer. During the image reconstruction, as it will be frequently requested to confirm such image under reconstruction, the photographing apparatus is preferably provided with a changeover switch. There is desired a switch of pushbutton, slider or dial type for a switch over by a single operation.

Also, even in case the image under reconstruction cannot be directly observed, an indicator showing a status of image generation can alleviate the stress of the user since an extent of image generation can be understood. Such indicator may indicate percentage of reconstruction by a numeral (text) or by a visual indication such as a bar graph.

Also a notice of completion of the image reconstruction to the user, such as by a buzzer, provides an advantage that the user can concentrate on the photographing operation without paying attention to the timing of completion of the image reconstruction.

Fourth Embodiment

Figure 13B:
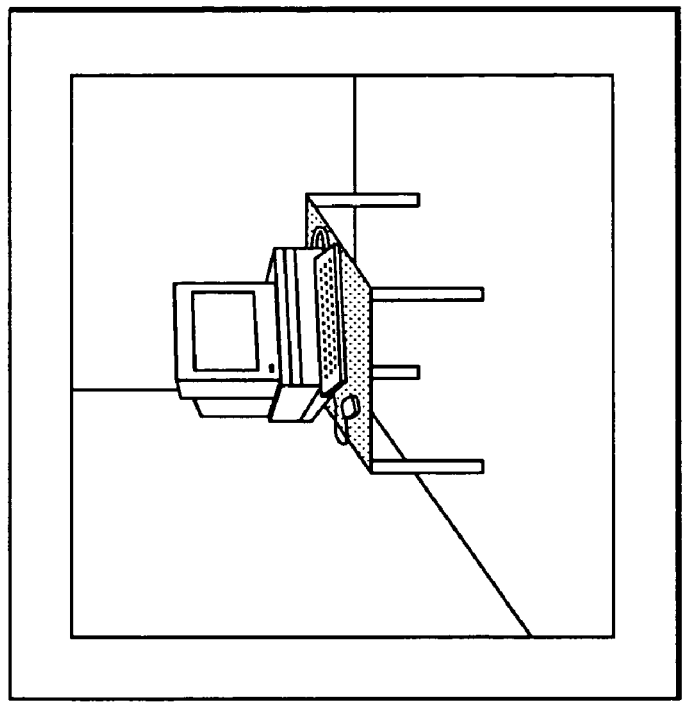
FIGS. 13A and 13B are views showing reconstructed images.
Figure 13A:
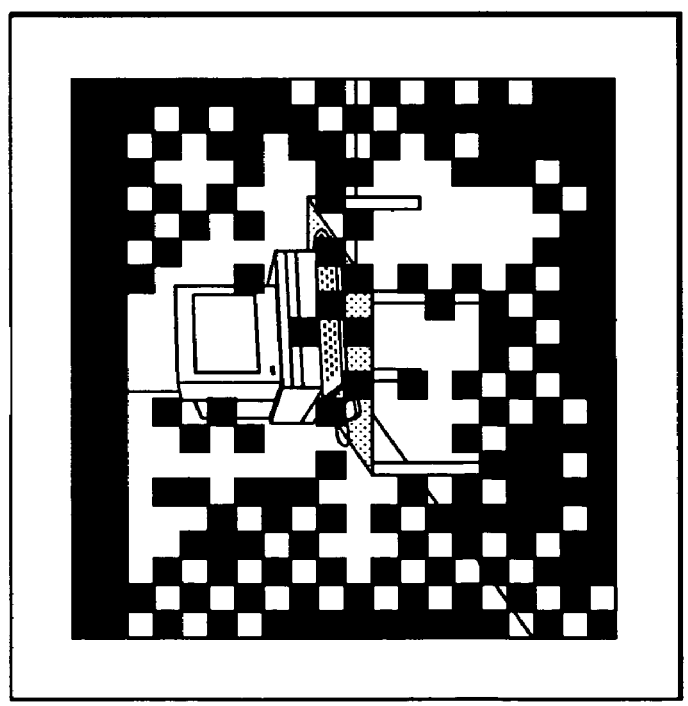

The third embodiment displays an image in the course of reconstruction, but such display takes place in a form as shown in FIG. 13A since a pixel for which the beam has not been obtained is unfixed in the value and cannot be displayed. In FIG. 13A, a tile-like block represents a pixel (a beam) for the purpose of simplicity. A display as shown in FIG. 13B is obtained finally as the beam acquisition proceeds, but a partially reconstructed image as shown in FIG. 13A is displayed in the course. Therefore, in the present embodiment, the image shown in FIG. 13A is displayed with an interpolation thereby displaying the interim image with a higher image quality. Normally the process is continued until all the beams necessary for reconstruction are obtained, but it need not be continued if a reconstruction image of a sufficiently high image quality can be obtained by such interpolation. In this case, the image reconstruction of a still higher speed is made possible, since the time required for obtaining the beams can be reduced.

Figure 14:
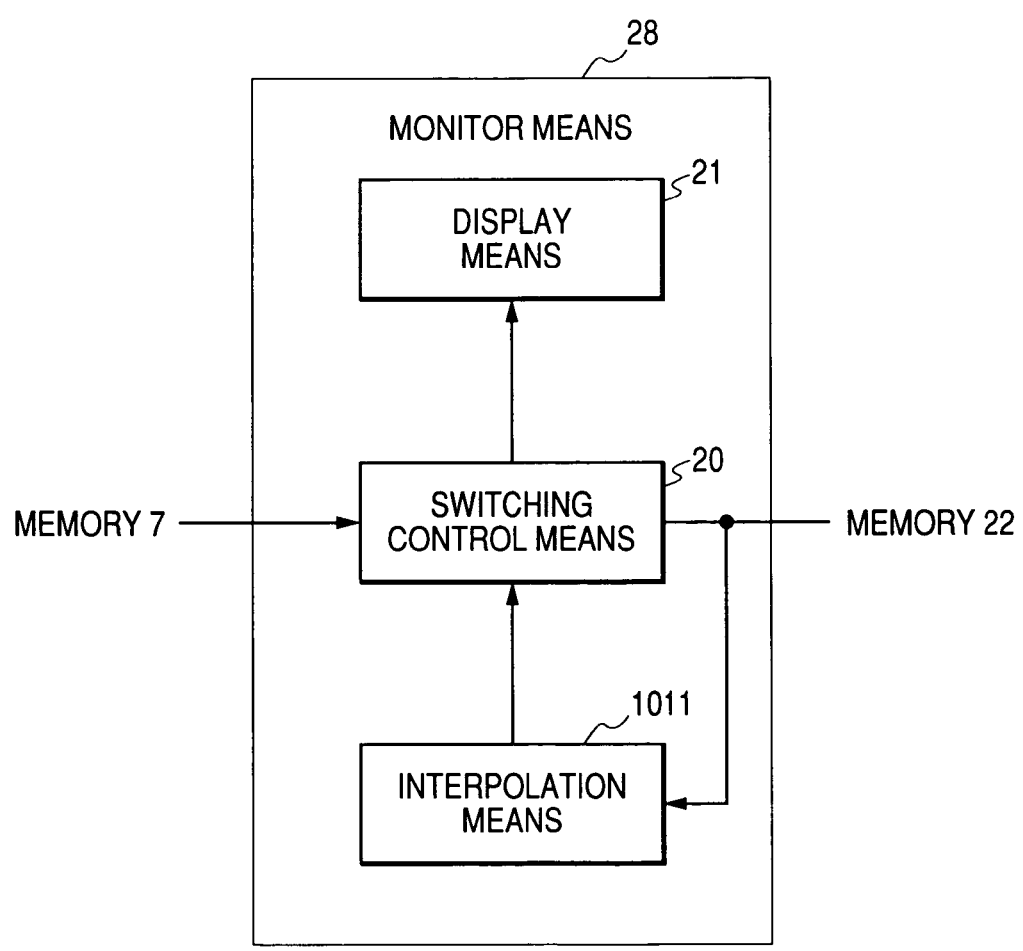
FIG. 14 is a view showing interpolating means.

FIG. 14 is a block diagram of a partially modified monitor means 28 of the third embodiment. An interpolation means 1011 for estimating an unfixed pixel value utilizing information of the memory 22, and outputs an image representing the result of interpolation to the switching control means 20. The switching control means 20 outputs the photographed image information (memory 7), the reconstructed image information (memory 22) or the interpolated image information to the display means 21 under switching by an instruction of the user or at a predetermined interval by a timer, and the display means 21 visibly displays the information from the switching control means 20. In case the quality of the interpolated image is judged sufficient, the reconstruction process is terminated at such point. Such judgment may be executed by the user under observation of the interpolated image or based on the number of obtained beams. In case it is based on the number of beams, there can also be adopted, for example, a method of utilizing interpolation after ⅔ of the beams required for reconstruction are obtained.

The interpolation can be achieved for example by an ordinary cubic interpolation or bi-linear interpolation. It is also possible to utilize a beam obtained in a nearby position as an approximate value, though it is somewhat different from the beam necessary for reconstruction. More specifically, in case there is required a beam to be obtained by displacing the camera by several centimeters, an approximately same beam is selected from the photographed image instead of such camera displacement.

Also a notice of completion of the interpolation process to the user, such as by a buzzer, provides an advantage that the user can concentrate on the photographing operation without paying attention to the timing of completion.

Introduction of such interpolation process provides an advantage of shortening the time required for image reconstruction, thereby enabling efficient photographing operation.

Fifth Embodiment

When the image reconstruction proceeds as shown in FIG. 13A, the user can estimate the image after reconstruction. The image reconstruction is executed for an entire image area, but the reconstruction of such entire image area may be unnecessary depending upon the object. The need of the user may be satisfied better by reconstructing a part of the image desired by the user at a higher speed, for example sufficiently reconstructing a photographed personal computer only. In the present embodiment, therefore, there are provided means for enabling the user to designate an area desired for reconstruction within the image.

Figure 33:
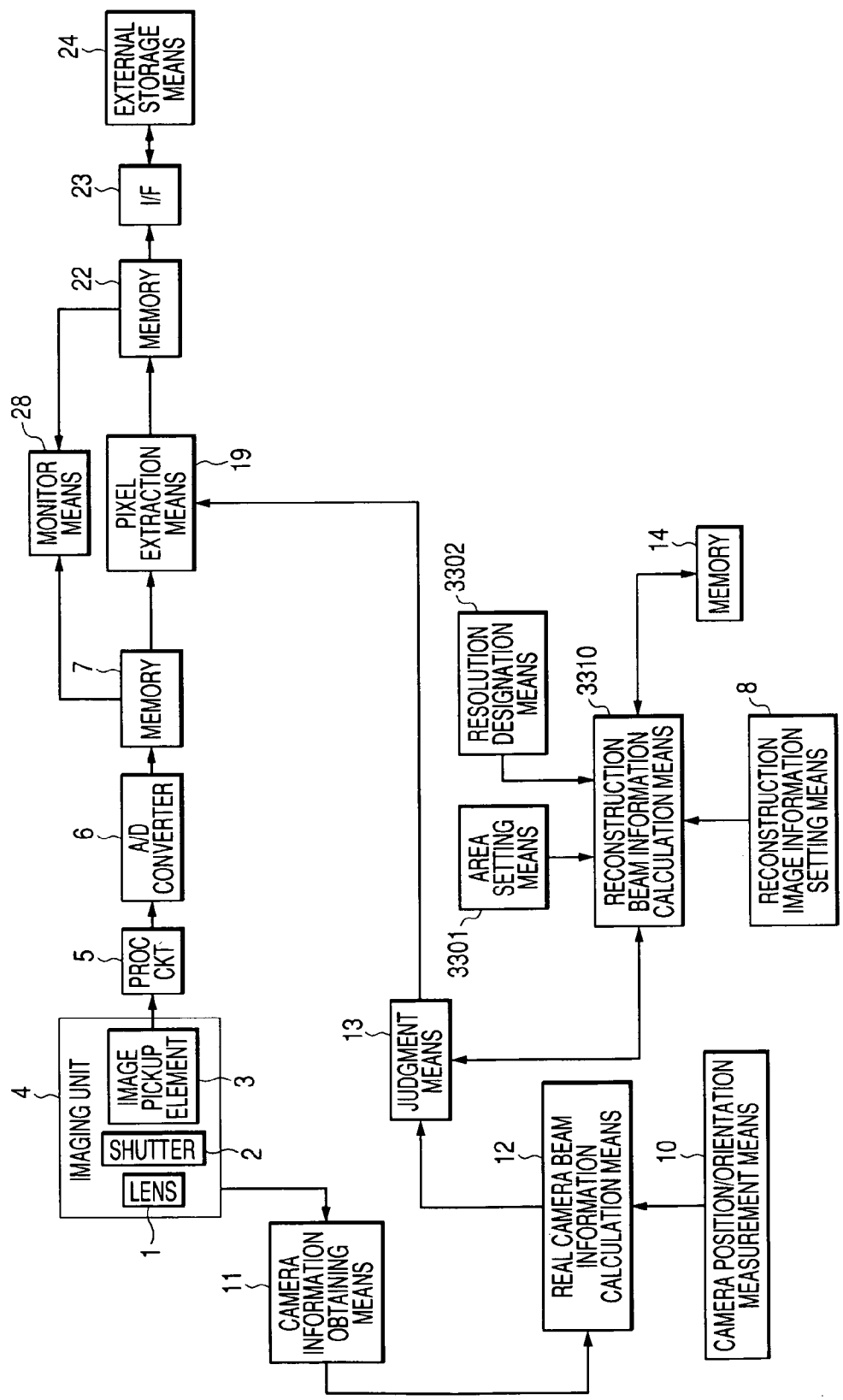
FIG. 33 is a block diagram of an embodiment provided with area setting means and resolution designation means.

FIG. 33 is a block diagram in which an area setting means 3301 and a resolution designation means 3302 are added to the fourth embodiment. The area setting means 3301 sets a partial area in the reconstructed image, and the resolution designation means 3302 designates, if necessary, a resolution of the image to be reconstructed for each partial area. A reconstruction beam information calculation means 3310 calculates necessary beam information, based on the information from the reconstruction image information setting means 8, the memory 14, the area setting means 3301 and the resolution designation means 3302.

Figure 15A:
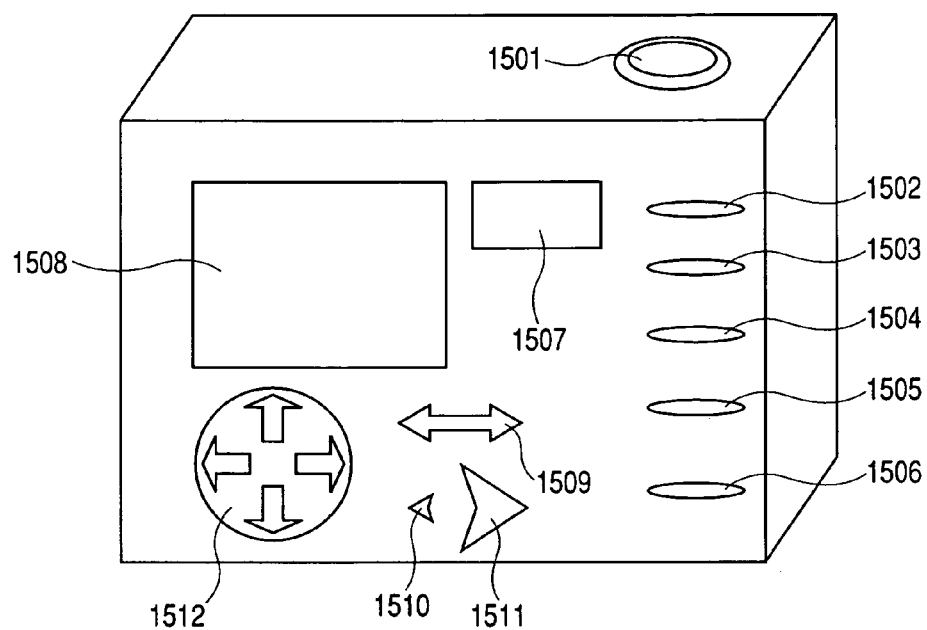
FIGS. 15A, 15B and 15C are schematic views of a camera (showing an example of a rear area)
Figure 15B:
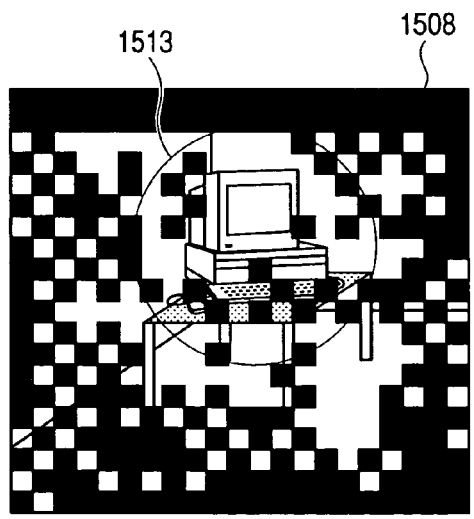
Figure 15C:
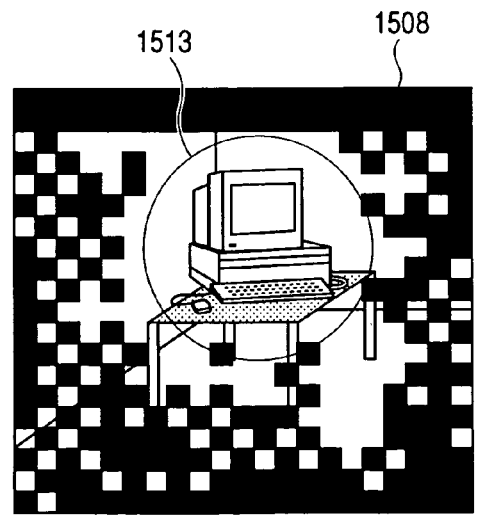

FIG. 15A shows an external view of a camera (an example of a rear part), for the purpose of explaining the area setting means 3301 and the resolution designation means 3302. There are shown a start button 1501, a power supply button 1502, a mode selection button 1503, a button 1504 for shifting to next data in a selected mode, a button 1505 for returning to previous data in the selected mode, and a setting button 1506. The mode selection button 1503 will not be explained as it will be explained a following sixth embodiment. There are also provided a view finder 1507, a display 1508 for displaying photographed data, an image under reconstruction or an interpolated image, and a button 1509 for designating a shape of a reconstruction area. Depressions of this arrow button while an area setting mode is set cause successive changes of an area, for example, in the order of "circle"→"rectangle"→polygon→ . . . , and a corresponding shape is displayed on the display 1508 as shown in FIG. 15B, which illustrates a state where a "circle" is designated. Buttons 1510, 1511 are provided for respectively contracting or enlarging the displayed pattern (circle in this example) and are used for setting the size of the area. A button 1512, used for moving the displayed pattern vertically and horizontally, is so operated as to bring the pattern (circle) to a desired position, and a setting button 1506 is depressed to fix the area. Once the area is thus designated, the reconstruction is executed thereafter only in the designated area. In the foregoing description, circle and polygons are described as shapes that can be designated for the area, but an arbitrary shape may be rendered selectable. For selecting an arbitrary shape, there may be adopted a user interface of placing "dots" on the image and connecting such dots with a straight or curved line.

Figure 16:
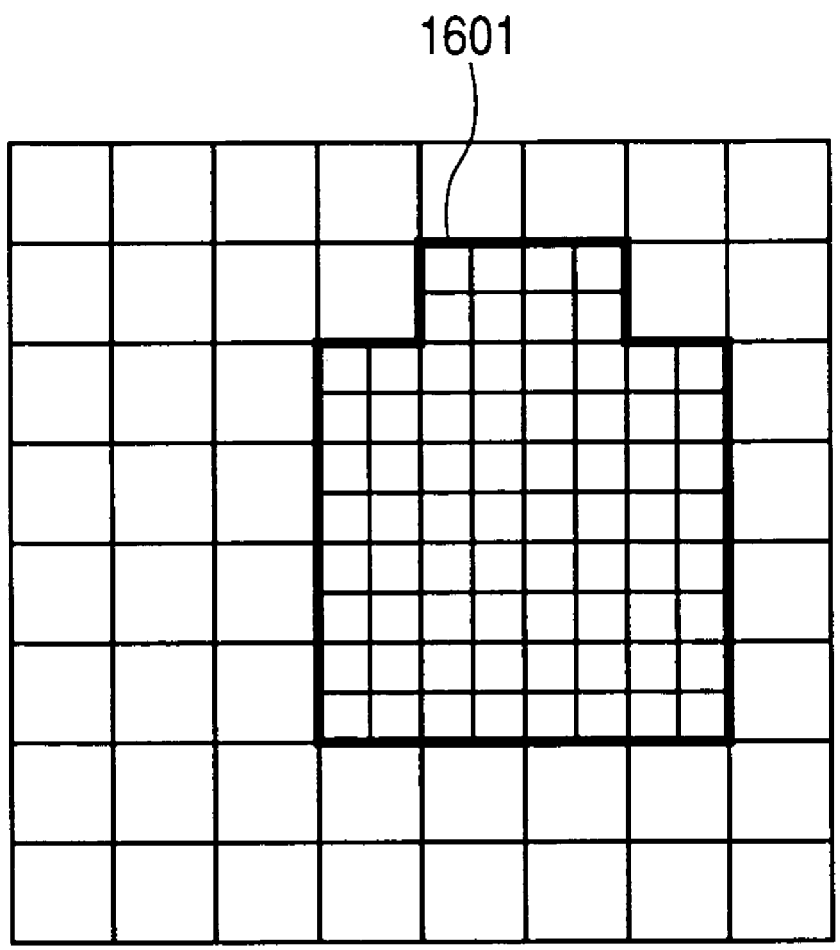
FIG. 16 is a view showing a partial increase in resolution of a reconstructed image.

Also there can be conceived a situation where a high resolution is only required in a desired object and not required in a surrounding area but a certain image is still required in such surrounding area. In order to respond to such situation, the resolution designation means 3302 designates the resolution in a set area. The resolution can be increased, as shown in FIG. 16, dividing the image under reconstruction only in an area where a high resolution is required. In FIG. 16, a designated area 1601 has a doubled resolution in the vertical and horizontal directions, in comparison with the surrounding area. More specifically, the resolution in the set area is designated by operating the mode selection button 1503 to select the resolution setting, and a button 1512 to call and select a preset resolution. In the illustrated example, the designated area has a doubled resolution in the vertical and horizontal directions, but such example is not restrictive and an arbitrary magnification may be selected. However a selection of the resolution equal to a power of two (quad-tree structure) facilitates the process.

The present embodiment has been explained by an example in which the designation can be executed in one area in the reconstructed image, but such example is not restrictive and there may be designated plural areas. In such case, the aforementioned designating process may be executed for the number of the required areas.

Also in case plural areas are designated, the resolution may be designated respectively different or may be same for all the designated areas. Also in case of designating plural areas, it is also possible to designate, in a designated area A, a new area B. In such case, the resolution becomes higher toward the area considered by the user, by selecting a high resolution in the area B, an intermediate resolution in the area A and a low resolution in the surrounding area.

As explained in the foregoing, it is rendered possible, by adding a user interface for enabling the user to designate a reconstruction area to the photographing apparatus, to execute the image reconstruction only in the desired area thereby improving the entire processing speed.

Sixth Embodiment

Figure 17:
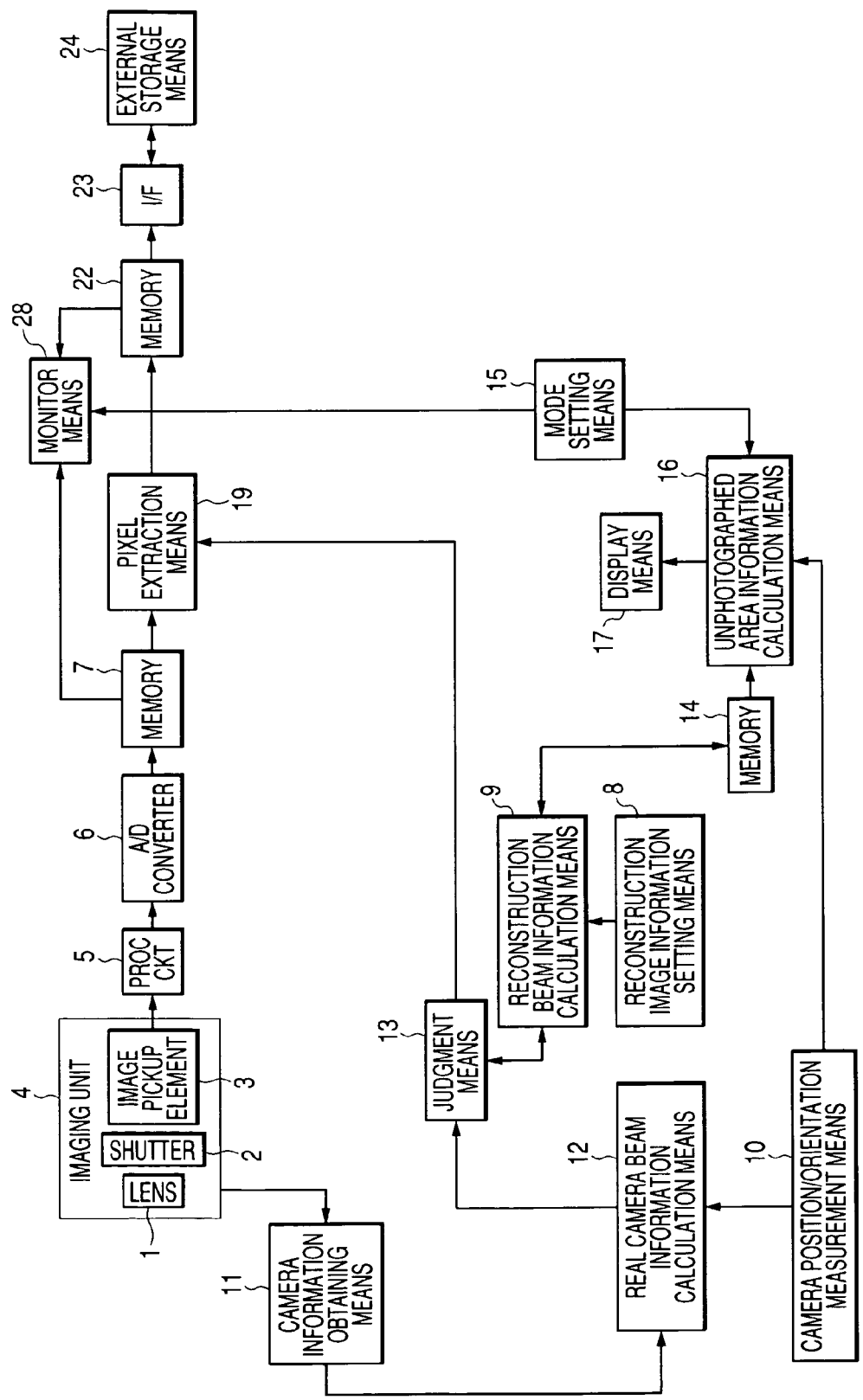
FIG. 17 is a view of an embodiment formed by adding a mode setting means 15, an unphotographed area information calculation means 16 and a display means 17 to a third embodiment.

FIG. 17 shows an embodiment in which a mode setting means 15, an unphotographed area information calculation means 16 and a display means 17 are added to the third embodiment.

Figure 19:
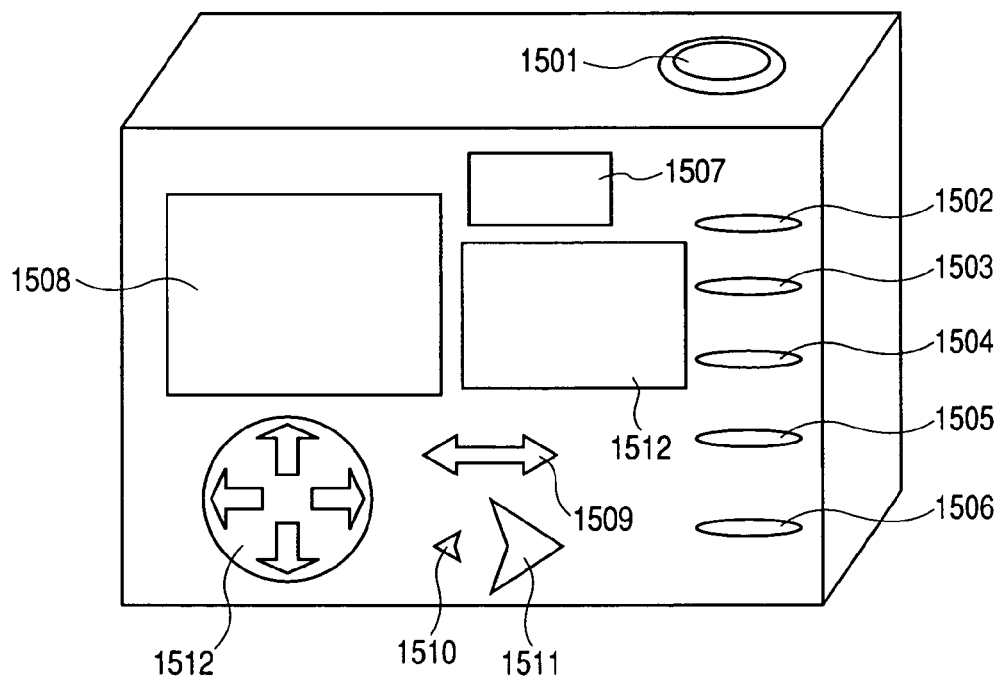
FIG. 19 is a schematic view of a camera (showing an example of a rear area) of the present embodiment.

The mode setting means 15 is linked with the mode selection button 1503 shown in FIG. 19. Mode information is displayed on the display 1508 in response to a depression of the mode selection button 1503, and is erased by a repeated depression. The mode includes, for example, a mode indicating for displaying the image under photographing or the image under reconstruction on the display 1508 or turning off the display, a mode for displaying/not displaying an unphotographed area on the display 1512, and a mode for area setting and resolution designation. In a state where a mode is displayed, depressions of the button 1504 change the modes in succession, and a depression of the button 1506 fixes the displayed mode, and operations of the buttons 1504, 1505 allow to change the set information of such mode. For example, in case of entering a numeral, the values are added or subtracted in predetermined steps, and, in case of entering data other than a numeral, data of predetermined sequence are changed in forward or backward direction in succession. The photographed image is displayed on the display 1508 in a mode for displaying the photographed image, while the image under reconstruction is displayed in a mode for displaying the reconstructed image, and the display on 1508 is turned off otherwise. Also an unphotographed area is displayed on the display 1512 in case the display mode is selected for the unphotographed area information display, while the unobtained beam information is displayed in case the display mode is selected for the unobtained beam information, and the display is turned off otherwise. In this example, the display 1512 is provided in addition to the display 1508, but it may also be dispensed with by displaying both images and the mode information under switching on the display 1508. The display means 17 shown in FIG. 17 corresponds to the display 1512.

In the following there will be explained a method for displaying the unphotographed area information. Such display method includes, for example:

(a) displaying positions requiring photographing with a color in a (rendered) three-dimensional space and showing a camera position therein;

(b) displaying unobtained beams in a (rendered) three-dimensional space and showing a position of the actually photographing camera therein;

(c) displaying navigation information indicating an amount and a direction of displacement and an orientation relative to the photographing camera; or (d) providing information (a)-(c) by voice information.

Figure 18:
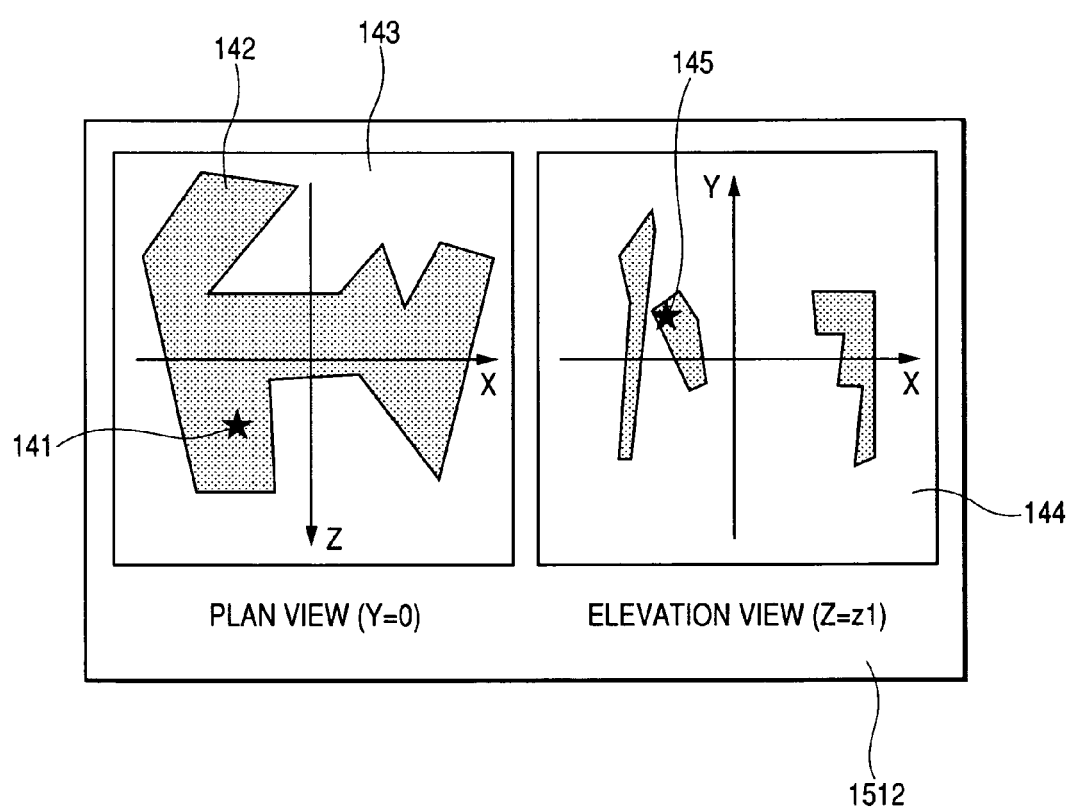
FIG. 18 is a view showing an unphotographed area and a camera position in a three-dimensional space.
Figure 20:
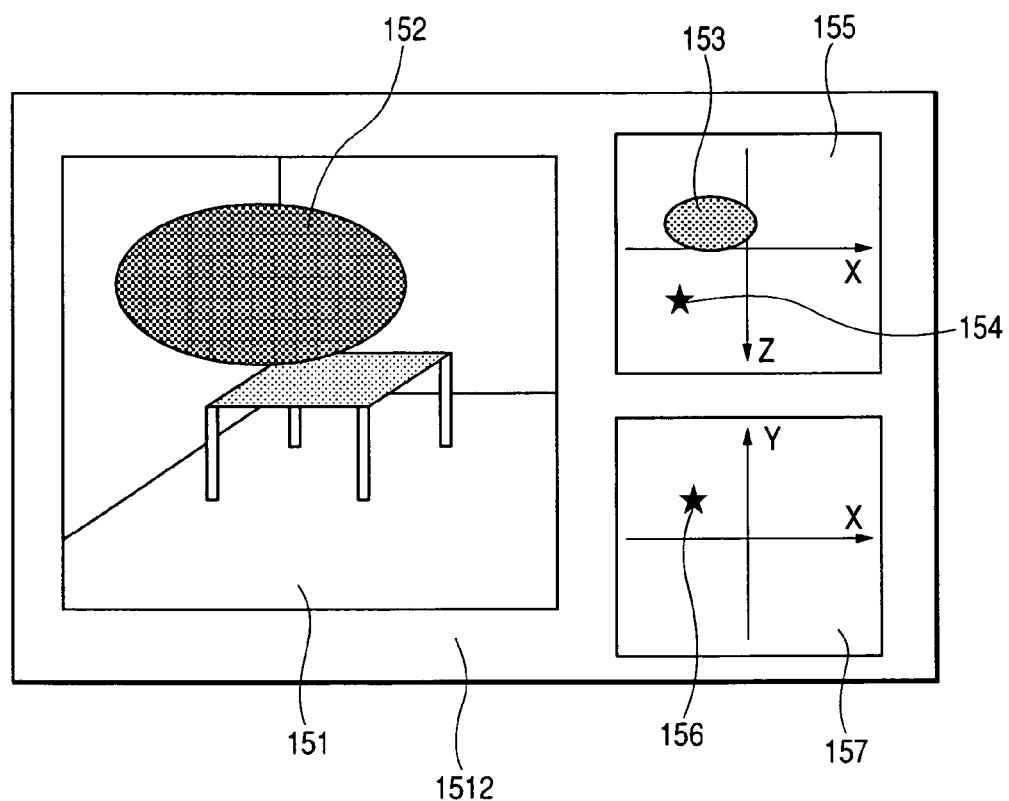
FIG. 20 is a view showing an example of display of an unphotographed area information.

FIG. 18 is a view showing the aforementioned case (a). A display 1512 for displaying the unphotographed area information displays the three-dimensional space respectively in a plan view (Y=0) 142 and an elevation view (Z=z1) 144, in which * marks 141, 145 indicate the camera position in the three-dimensional space, respectively in the plan view and the elevation view, and colored portions (hatched portions) 142 etc. represent unphotographed areas. The position of the camera in the three-dimensional space is assumed as (x1, y1, z1). As the elevation view show a plane at Z=z1, the displayed unphotographed area information changes with the displacement of the camera. The user moves the camera to an unphotographed area, referring to such information, and obtained the necessary beam. In FIG. 18, since the orientation information of the camera is not presented, the photographing operation for obtaining the beam has to be executed by directing the camera in all the directions. In order to improve such situation, it is also possible to separately provide a display on the camera orientation. For a display in such case, by placing a polygonal cone of which pointed end is at the view point position so as to surround a necessary beam, it is rendered possible to understand the direction of the camera, thereby enabling efficient beam acquisition. FIG. 20 shows another example, in which there are shown a three-dimensional scene 151 on which an unphotographed area is superposed, a superposed unphotographed area 152, an unphotographed area 153 expressed on a plan view (Y=0), a camera position 154, 156, a plan view (Y=0) 155, and an elevation view (Z=z1) 157. The three-dimensional scene is generated by superposing the unphotographed area on the current image from the camera. Such display allows to instinctively understand how the camera is to be moved with respect to the observed scene, thereby enabling more efficient camera movement and facilitating the beam acquisition.

Figure 21:
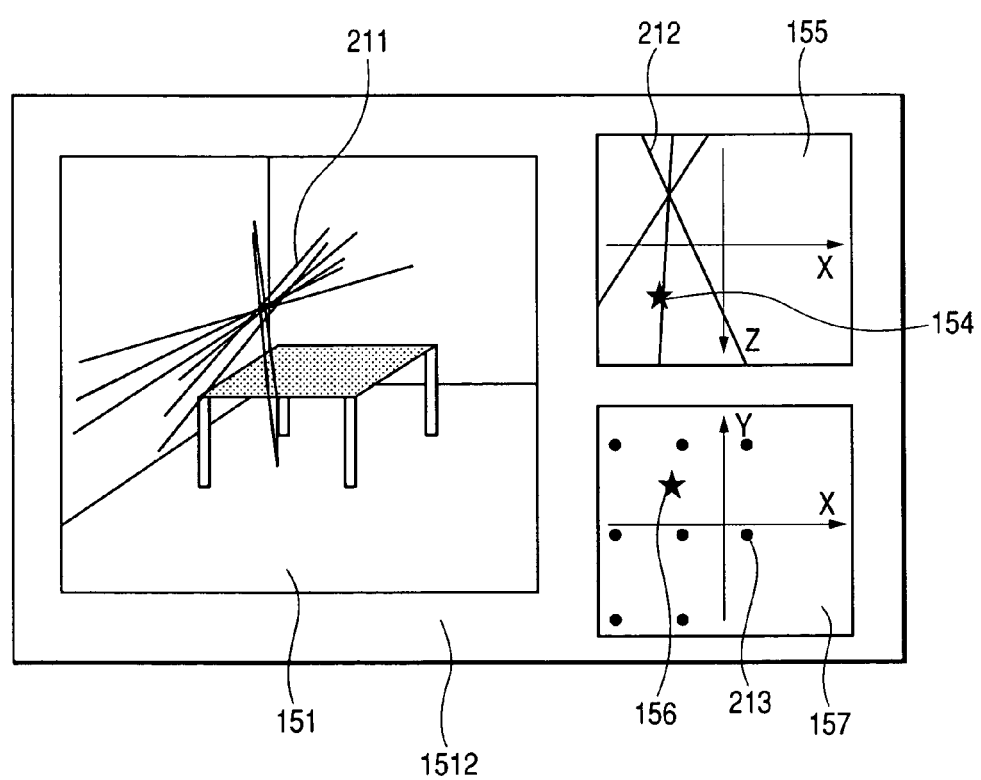
FIG. 21 is a view showing an example of display of an unphotographed area information.

FIG. 21 illustrates the aforementioned case (b). For simplifying the explanation, it is assumed that the image reconstruction is completed by obtaining nine beams. There is illustrated a situation where only one beam has been obtained. There are shown unphotographed beam information 211, the unphotographed beam information 212 projected onto a plane of Y=0, and the unphotographed beam information 213 (eight black dots) on a cross section at Z=z1. Such display allow to readily understand the camera position necessary for beam acquisition, thereby enabling efficient obtaining of the beam information. It is also possible to readily understand the direction of the camera, as the beam to be obtained is directly displayed.

Figure 22:
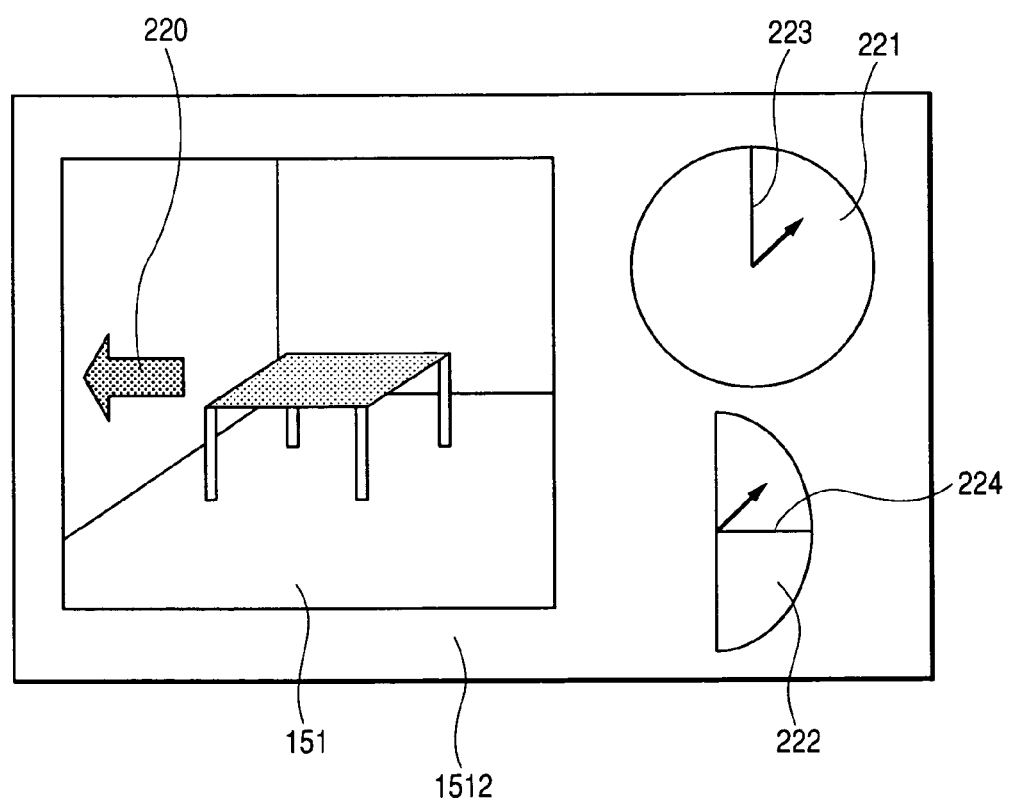
FIG. 22 is a view showing an example of display of an unphotographed area information.

FIG. 22 shows a navigation by an arrow. There are shown an arrow 220 indicating a direction in which the camera is to be moved, a horizontal angular meter 221 indicating a direction in which the camera is to be directed on a horizontal plane including the optical axis of the camera, and a vertical angular meter 222 indicating a direction in which the camera is to be directed on a vertical plane including the optical axis of the camera. The beam can be efficiently obtained by moving the camera along the arrow 220 and controlling the camera orientation in such a manner that an arrow in 221 coincides with the optical axis (line 223 passing through the center of circle) and that an arrow in 222 coincides with the optical axis (line 224).

Also the aforementioned voice navigation (d) allows to obtain the beam by displacements and rotations according to voice instructions such as:

a displacement according to a voice instruction "move forward by 3 meters" followed by an instruction "stop" at an object position;

a rotation according to a voice instruction "rotate to right" followed by an instruction "stop" at an object angle; and a rotation according to a voice instruction "rotate upward" followed by an instruction "stop" at an object angle.

This procedure is merely an example and other instructions may also be utilized.

As explained in the foregoing, the present embodiment is provided with means for presenting unphotographed beam information to guide the user, thereby enabling to obtain the desired beams efficiently and within a short time.

Seventh Embodiment

It is also conceivable that an unexpected intruder is photographed in the course of an actual photographing operation. Since the presence of such intruder inhibits the acquisition of the desired beam, it is necessary to invalidate the photographed image and to repeat the photographing operation. The present embodiment provides measures against the intruder.

Measures in case of presence of an intruder can be:

1. the user recognizes the intruder, temporarily cancel the photographing and repeats the operation by returning the camera to a state before the intruder is photographed; or 2. automatic judging means for the intruder is provided to execute a feedback control. However, the obtained beam or the current photographing need not be cancelled unless the beam to be obtained is not affected.

At first, the method 1 is to cancel the beam information to a timing for example several seconds prior to the discovery of the intruder by the user and to repeat the photographing from such timing. By recording a time code or the like simultaneously with the obtained beam information, it is possible, through a comparison with the time code at the discovery of the intruder, to return to a state for example five seconds before the discovery. However, as the discovery may be delayed, the length of returning time is preferably rendered arbitrarily selectable.

Figure 23:
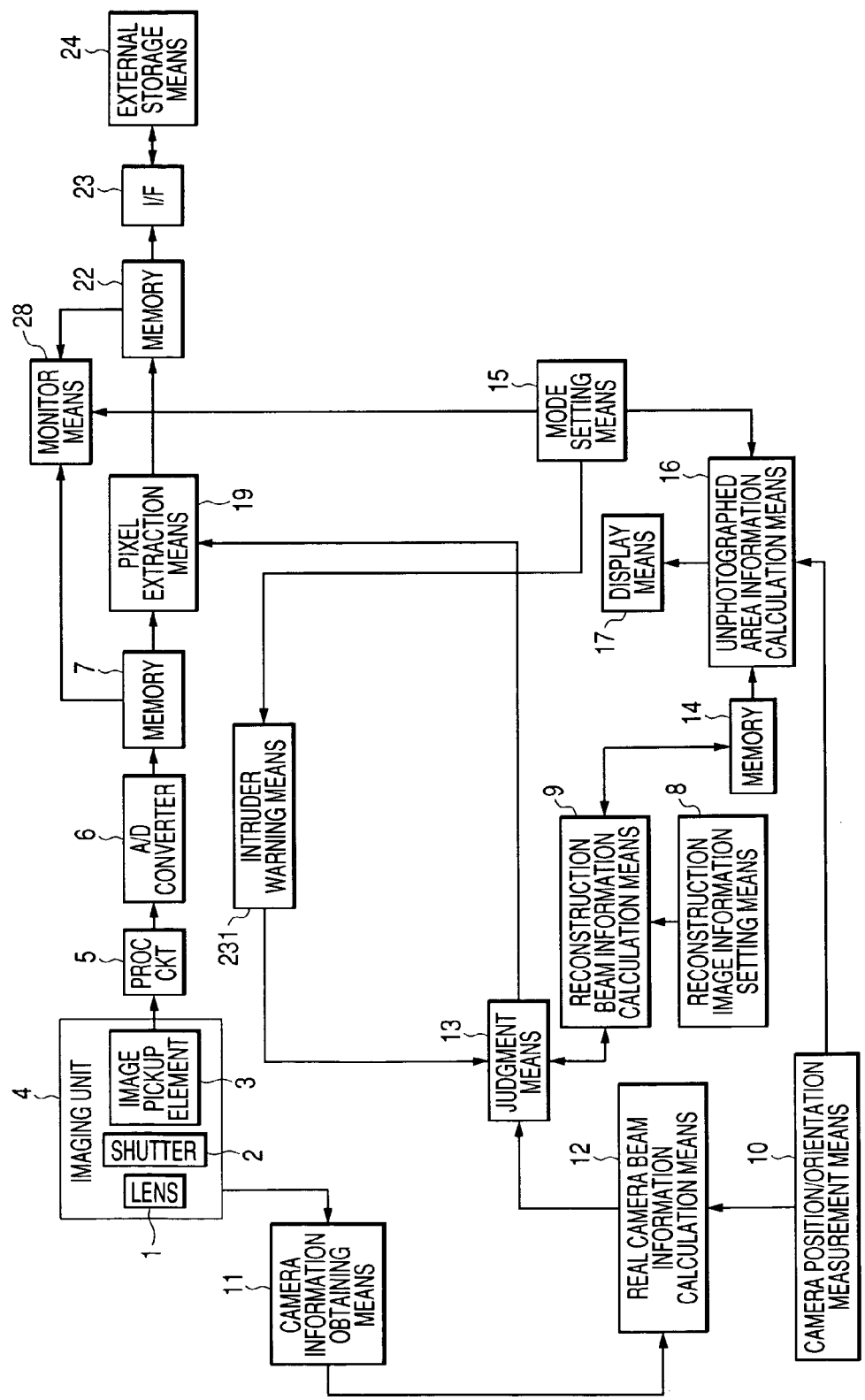
FIG. 23 is a block diagram showing a case in which intruder detection means is added.

FIG. 23 shows an example in which an intruder warning means 231 is provided in the sixth embodiment. A mode setting means 15 sets information indicating a number of returning seconds in response to a depression of the intruder warning means (button) by the user, and, when the button is depressed, the beams are canceled for such number of seconds through a judgment means 13. When the beams are canceled, data relating to the unphotographed area display corresponding to the canceled beams are also reset. The process for obtaining the beam may be re-started either by a re-depression of the intruder warning means or after the lapse of a certain number of seconds.

Figure 24:
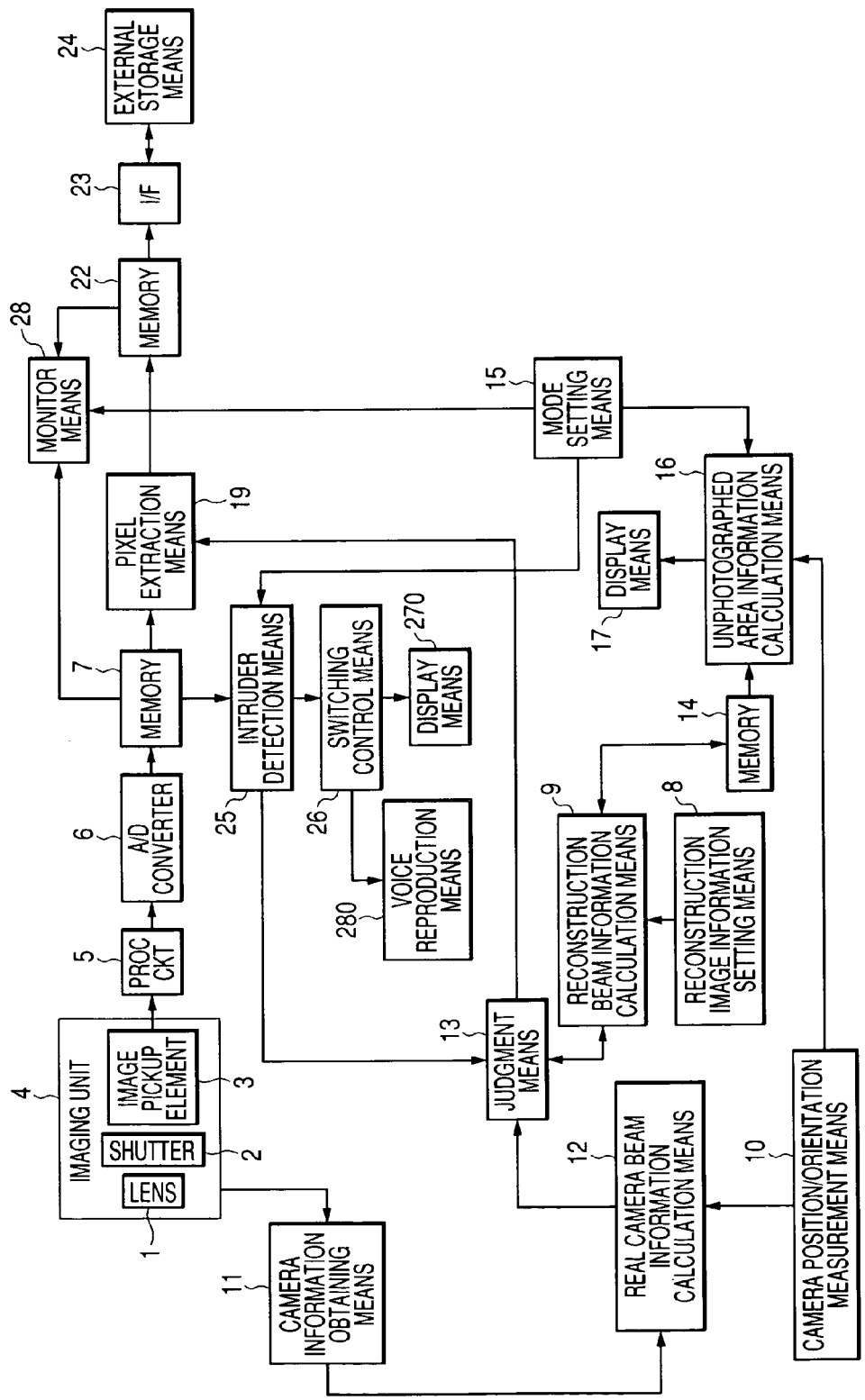
FIG. 24 is a block diagram showing a case in which automatic intruder detection means is added.

FIG. 24 shows an embodiment in which the intruder is detected automatically instead of the user. There are shown an intruder detection means 25, a switching control means 26, a display means 270, and a voice reproduction means 280. Upon detecting an intruder, the intruder detection means 25 gives an instruction to the judgment means 13 to cancel the obtained beams for a certain time. This time is preselected by the mode setting means. When the process is interrupted by the detection of the intruder, a warning for example "intruder present" is visually displayed on the display means 270 or by the voice reproduction means 280. The switching control means 26 selects, in the presence of an intruder, whether a display, or a voice warning or both.

The function of the intruder detection means 25 will be explained. For example, an image preceding, by one frame, the currently photographed image is retained and a motion vector is determined to the current image. In case the object is stopped, a motion vector resulting from a displacement of the camera can be determined approximately, so that an object showing an evidently different movement can be judged as an intruder. Presence of an intruder can also be suspected in case a color in the image shows a significant change.

As explained in the foregoing, means for detecting an unexpected intruder allows to prevent a defect that an unnecessary intruder is photographed in the reconstructed image, thereby enabling efficient acquisition of the beams necessary for image reconstruction.

Eighth Embodiment

Figure 25:
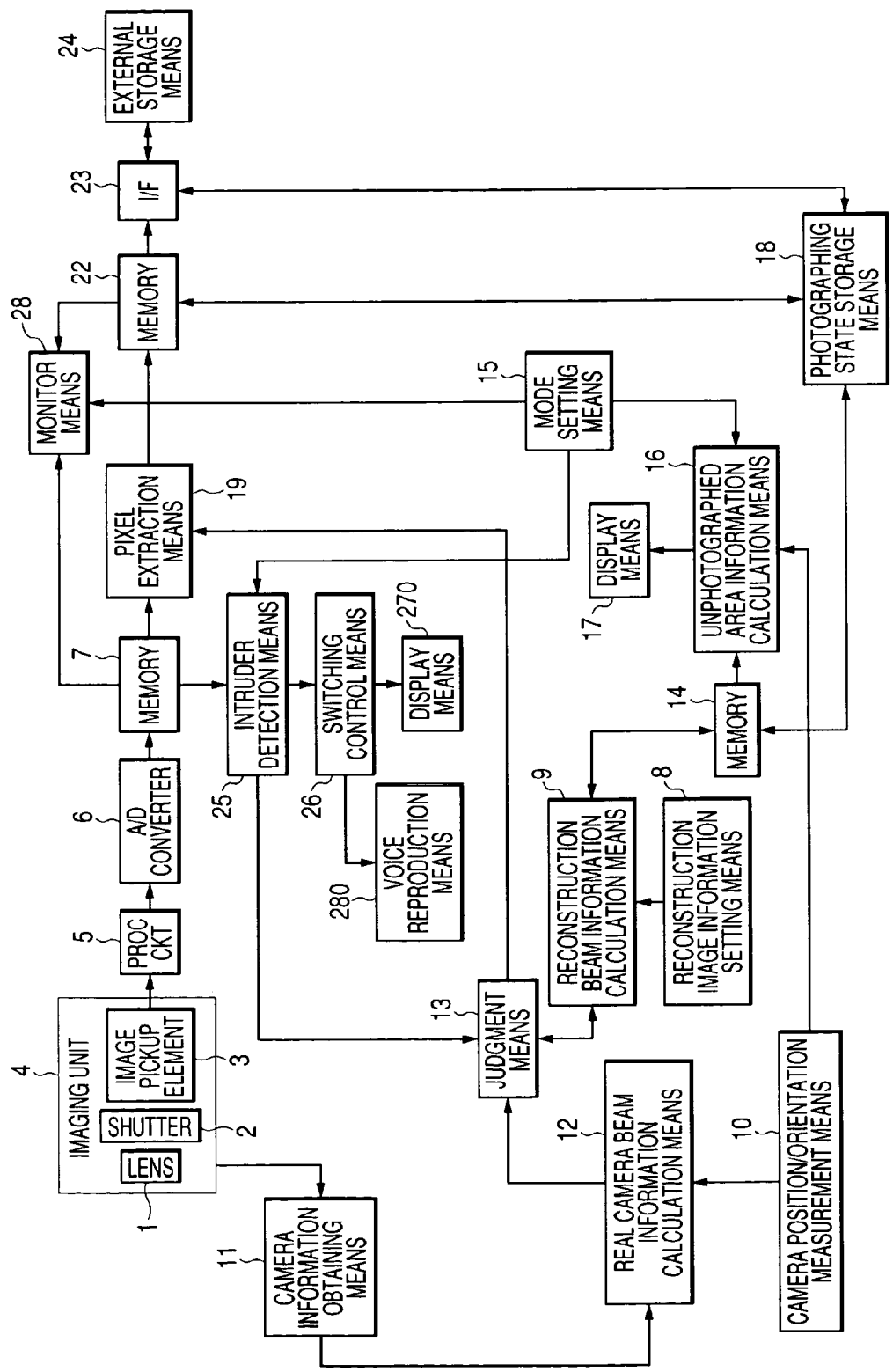
FIG. 25 is a block diagram showing a case in which a resuming function is added.

In an actual photographing operation, there may result a situation where the photographing (reconstruction) has to be temporarily interrupted. As a measure for such situation, FIG. 25 shows an embodiment having a resume function.

A photographing state storage means 18 outputs an image in the course of reconstruction, obtained beam information and various parameters necessary for the reconstruction to an external I/F 23 for storage in an external storage means 24.

When the process is re-started, information such as various parameters necessary for reconstruction, reconstructed image, obtained beam information etc. are read from the external storage means 24 through the external I/F 23 and are set in the memories 14 and 22.

Such configuration allows to cope with an unexpected interruption, thereby achieving desired image reconstruction efficiently.

Ninth Embodiment

The first embodiment adopts a method of directly inputting a view point position of a reconstructed image as a position in a three-dimensional space, but the present embodiment provides a simpler method for setting the view point position.

Figure 26:
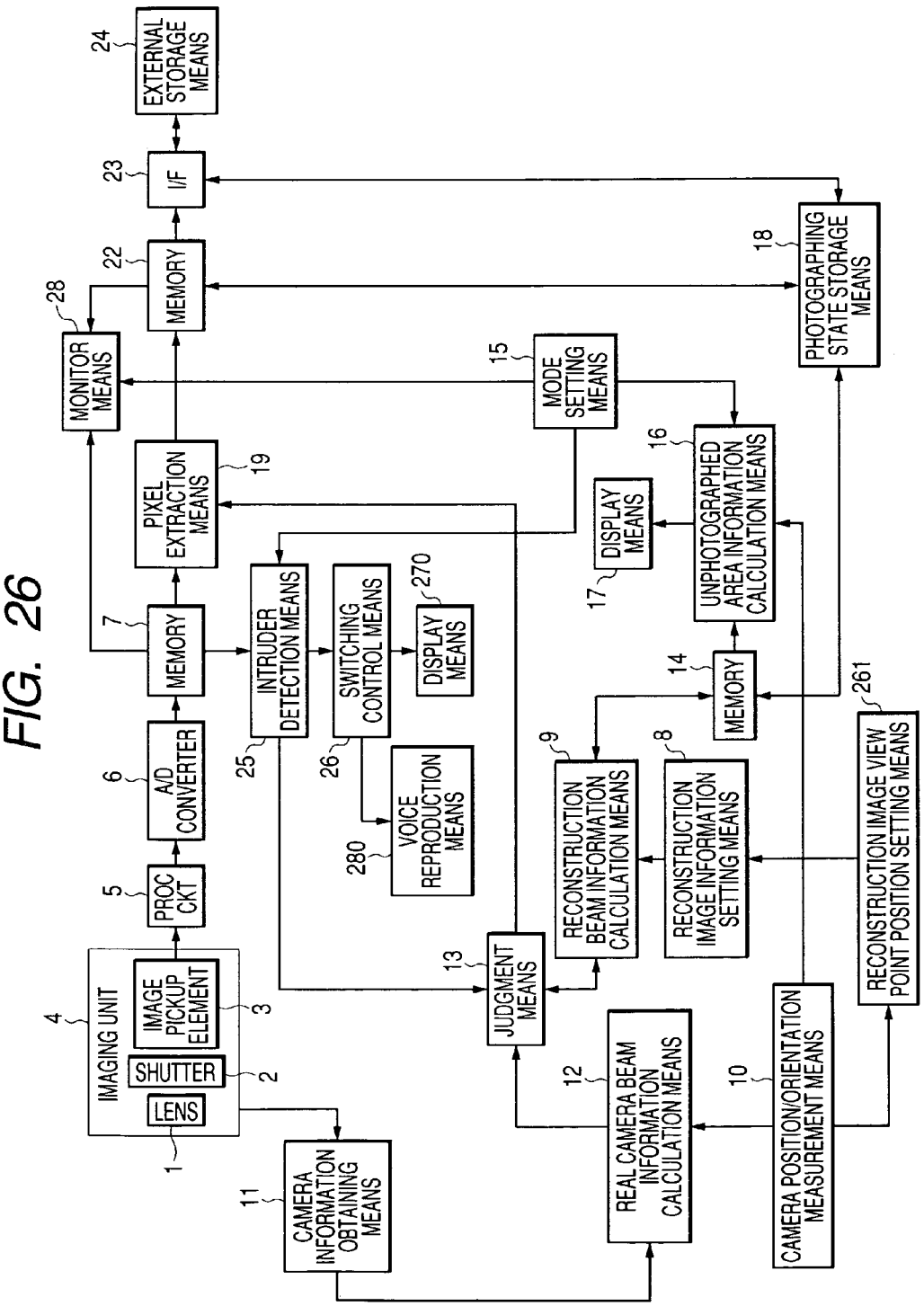
FIG. 26 is a block diagram of the present invention provided with view point position setting means.

FIG. 26 shows an embodiment in which a reconstruction image view point position setting means 261 is added to the eighth embodiment. For setting the view point position, there can be utilized methods of:

1. directly inputting a three-dimensional position;
2. executing a stereo photographing by utilizing a single-lens camera twice thereby determining position and orientation;
3. instructing position and orientation by an epipolar line; and
4. instructing position and orientation by a measurement with a stereo camera.

Since the method 1 has been explained in the first embodiment, methods 2-4 will be explained in the present embodiment.

Figure 27:
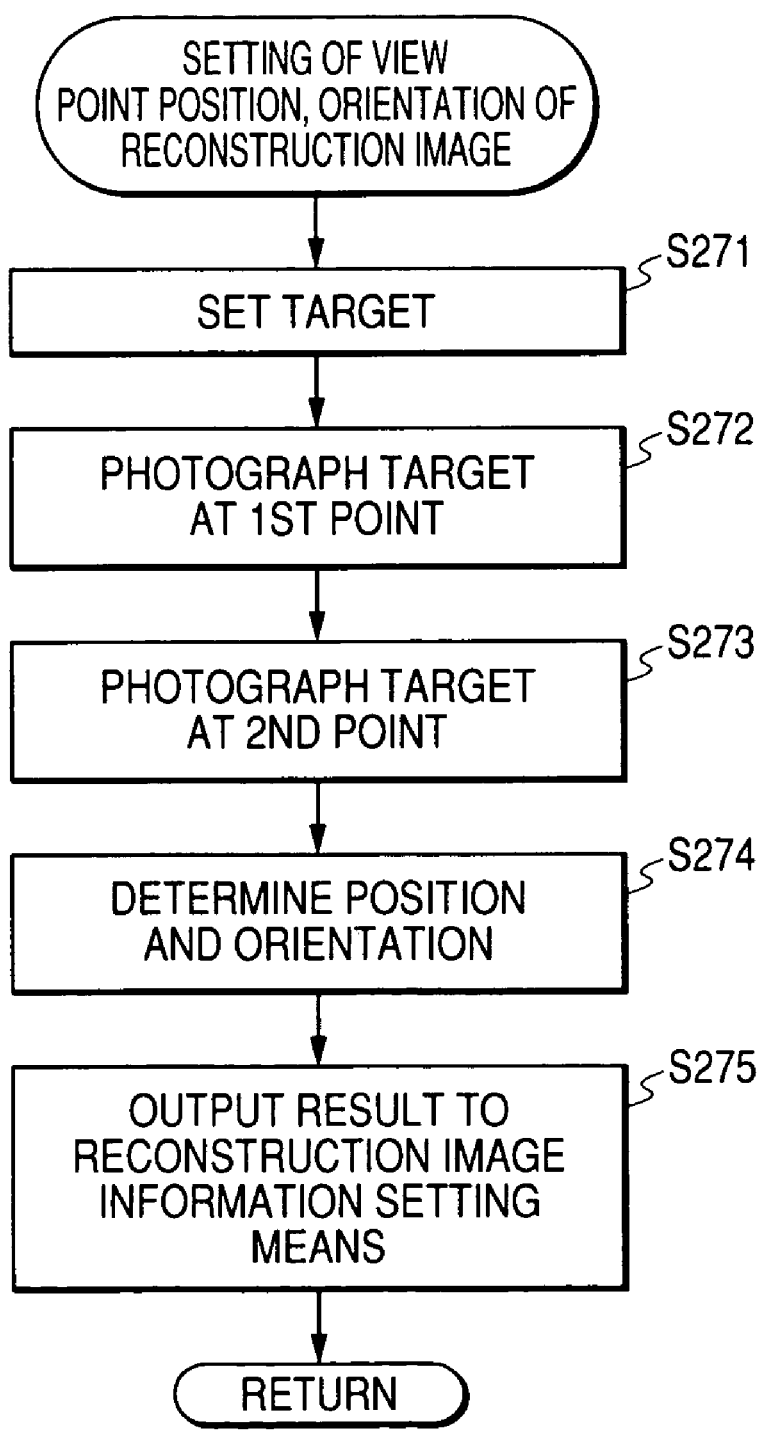
FIG. 27 is a flow chart of a process for instructing a view point position and an orientation of a reconstructed image utilizing a single-lens camera.

FIG. 27 shows a flow chart of a process for designating a view point position and an orientation of a reconstructed image utilizing a single-lens camera. In case a target (index) is present at the view point position of the reconstructed image, a step S271 specifies such target (index). Then a step S271 executes a photographing in such a manner that the optical axis passes through the target. A local coordinate system is set utilizing the position and orientation of the camera in such state. The setting method can be similar to that explained in the first embodiment and will not therefore be explained further. Then a step S273 executes a photographing after a displacement of the camera. Also in this case, the photographing is executed in such a manner that the optical axis passes through the target. As the distance between the first photographing position and the second photographing position constitutes a base line for stereo measurement, it is selected with a certain magnitude in order to improve the positional precision. A step S274 calculates the position of the target in the local coordinate system, based on a stereo measurement utilizing the position and the orientation in the first and second photographings. The position thus calculated is selected as the view point position of the reconstructed image. As to the orientation, there may be employed a method in the first embodiment, namely a method of maintaining the camera at a desired orientation and taking an orientation, outputted by the orientation sensor of the camera, as the orientation of the reconstructed image. A step S275 outputs the determined view point position and orientation of the reconstructed image to reconstruction image view point position/orientation setting means.

Figure 28A:
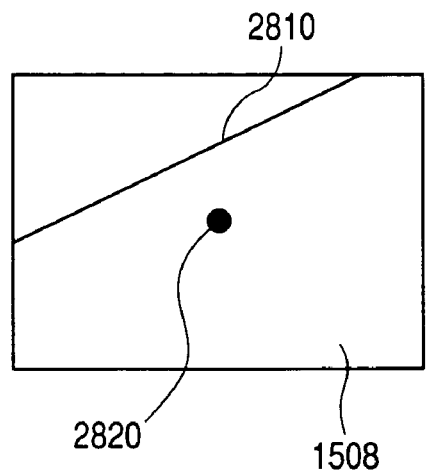
FIGS. 28A and 28B are views showing a superposed display of optical axes.
Figure 28B:
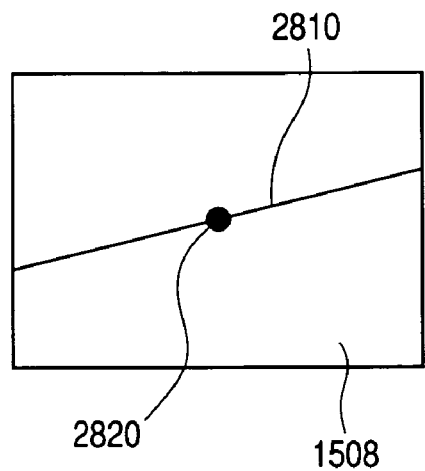

In the following, there will be explained a method in case a target (feature point or index) is absent at the view point position of the reconstructed image to be generated. For example, in case a point in the space is desired as the view point position, it is possible, by determining the point in the space in a first location, to set the camera in such a manner that the optical axis thereof passes through such point in the space, but it is difficult to specify such point from a second location because of the lack of the index. It is therefore difficult to determine the position of such "point in the space" by a stereo measurement between two different locations. Therefore, the "point in the space" is determined in the first location, then the camera is so set that the optical axis thereof passes through such point, and the position and the orientation in such state are memorized. Then, when the camera is displaced to the second location, the optical axis (straight line) of the camera in the first location is displayed in superposition with a camera image at the second location. This mode will be explained with reference to FIGS. 28A and 28B. FIG. 28A shows an image in which the optical axis of the camera in the first location is superposed with a camera image at the second location. There are shown an optical axis 2810 of the camera at the first location, and a current optical axis 2820 (assumed as a normal line to the center of the image pickup plane) of the camera. The point determined in the first location is present on the line 2810. FIG. 28B shows an image photographed by the camera in a location different from that of FIG. 28A, the camera being so moved that the optical axis 2820 exists on the line 2810. By matching a point on the line with the optical axis 2820, it is possible to specify the "point in the space", and the position can be determined from a stereo measurement based on the position and orientation of the camera in such state and the position and orientation of the camera in the first location. The orientation can be designated by a method similar to that in the first embodiment.

As explained in the foregoing, since it is only required, at the second location, to specify a point on the optical axis 2810 of the camera in the first location, the specifying of the "point in the space" can be facilitated in comparison with a case of absence of the index, whereby the operation of setting the view point position and orientation of the reconstructed image can be made easier.

Also the operation of specifying a space in the three-dimensional space can be executed more directly by changing the camera to a stereo camera. In case of a stereo camera, it is set in a state capable of stereo viewing in the view finder and a mark or a pointer is displayed in the space. It is rendered possible to designate a point in the space in a simple manner by designating a point in the three-dimensional space by a movement of such mark or pointer. The position of the designated point can be easily calculated because of use of the stereo camera. The orientation can be designated by a method similar to that in the first embodiment. For mark movement, there may be provided buttons for moving in six direction, namely front and back, up and down, and left and right, or only two buttons for front and back are suffice in case of designating a point on the optical axis of the camera. A stereo viewing is realized in the view finder, but it can also be achieved on the display 1508 or 1512 by applying a lenticular sheet.

As explained in the foregoing, by changing the camera to a stereo camera, it is rendered possible to designate a point in the three-dimensional space more directly, thereby significantly improving the work efficiency. Also the presence of two lenses enables more efficient obtaining of the beams in a shorter time, in comparison with the case of a single lens. The beam obtaining process can be achieved by repeating the process explained in the first embodiment twice, as the beams of two locations can be obtained at a time.

Tenth Embodiment

Figure 29:
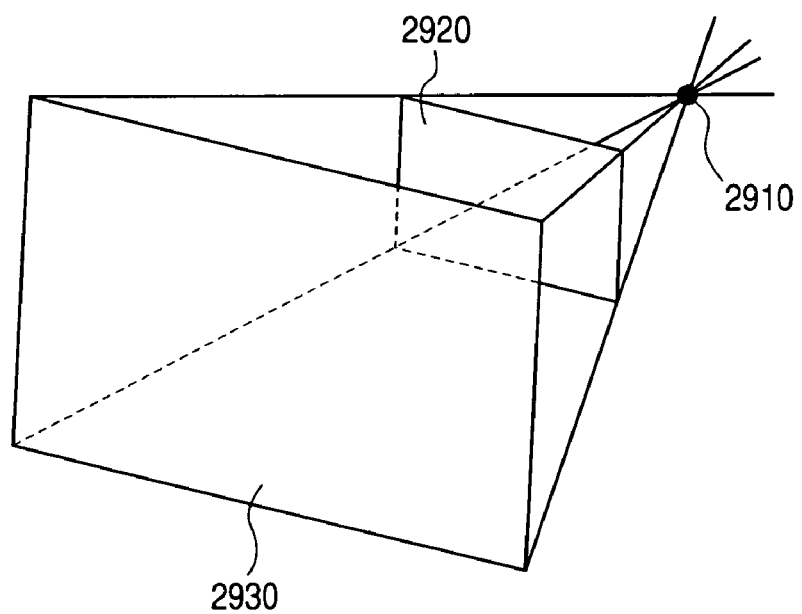
FIG. 29 is a view showing a view point position and a photographing range.

Necessary beam group can be specified by determining the view point position and the orientation of the reconstruction image and the angle of view and the pixel number thereof. However, in case the view point position of the reconstruction image is distant from the position actually photographable with the camera, the photographing operation has to be made over a wide range in order to obtain the necessary beams. FIG. 29 shows such state, in which there are shown a view point position 2910 of the reconstruction image, an area 2920 in which the camera has to be displaced in order to obtain the necessary beams in a situation somewhat distant from the view point position, and a camera displacement range 2930 required for obtaining the beam in a position more distant than 2920 from the view point position 2910. As the moving range of the camera becomes wider as the distance from the view point position increases, it is efficient, at the setting of the view point position of the reconstruction image, to provide the user with an extent of displacement in order to obtain all the beams at the current position of the user, thereby avoiding selection of a view point position necessitating a beam that is impossible to obtain. It is thus possible to avoid a failure of knowing in the course of reconstruction that the reconstruction involves a beam impossible to obtain and repeating the procedure by changing the view point position.

Figure 30:
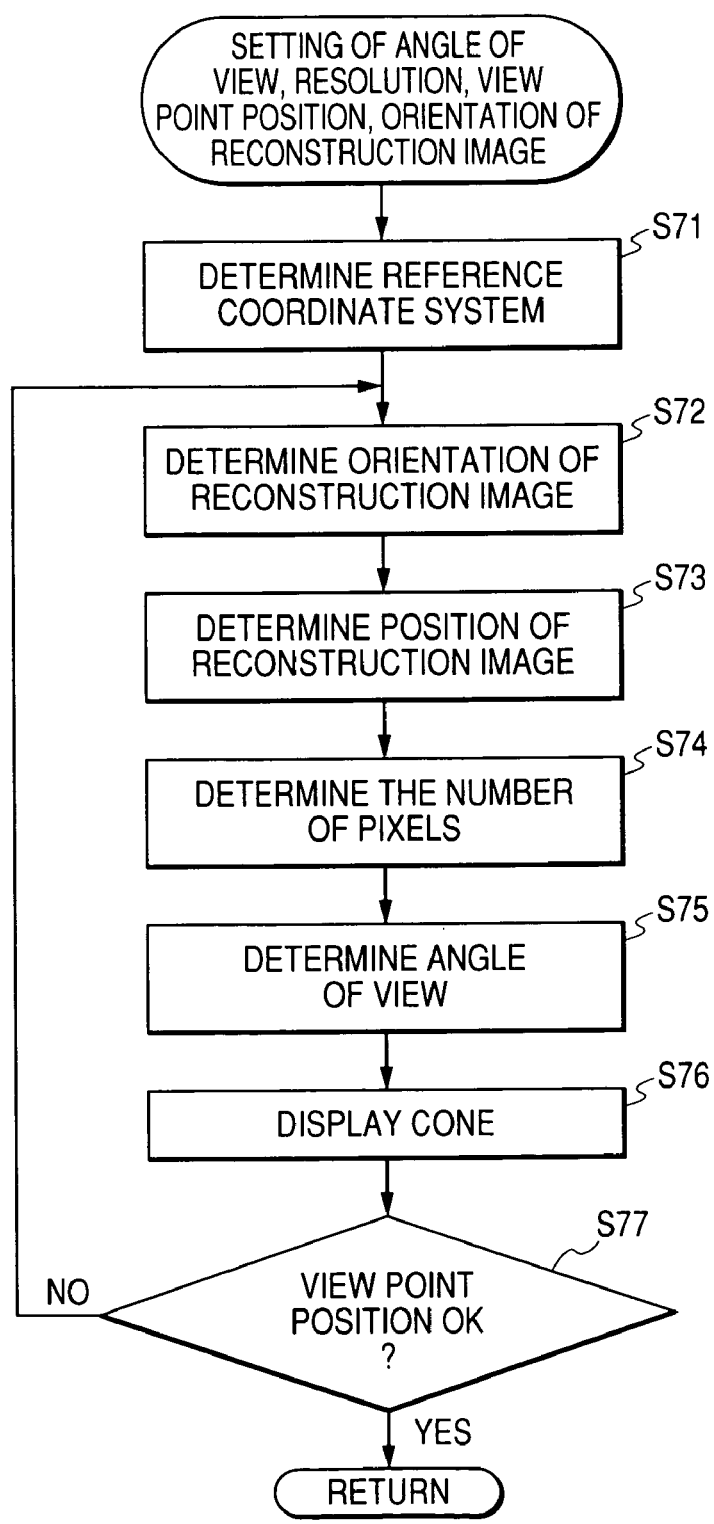
FIG. 30 is a flow chart showing a process for displaying a conical member at the view point position setting.
Figure 31A:
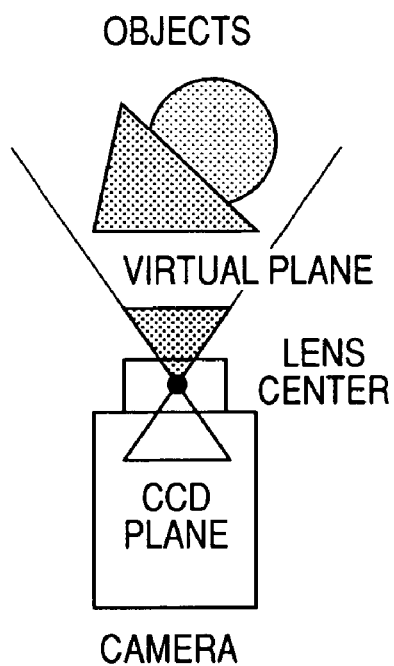
FIGS. 31A and 31B are views showing a principle of a method for generating an image of an arbitrary view point.
Figure 31B:
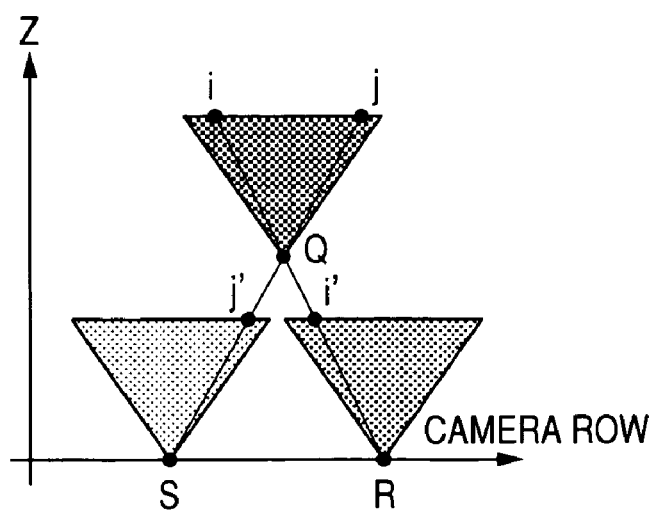
Figure 32:
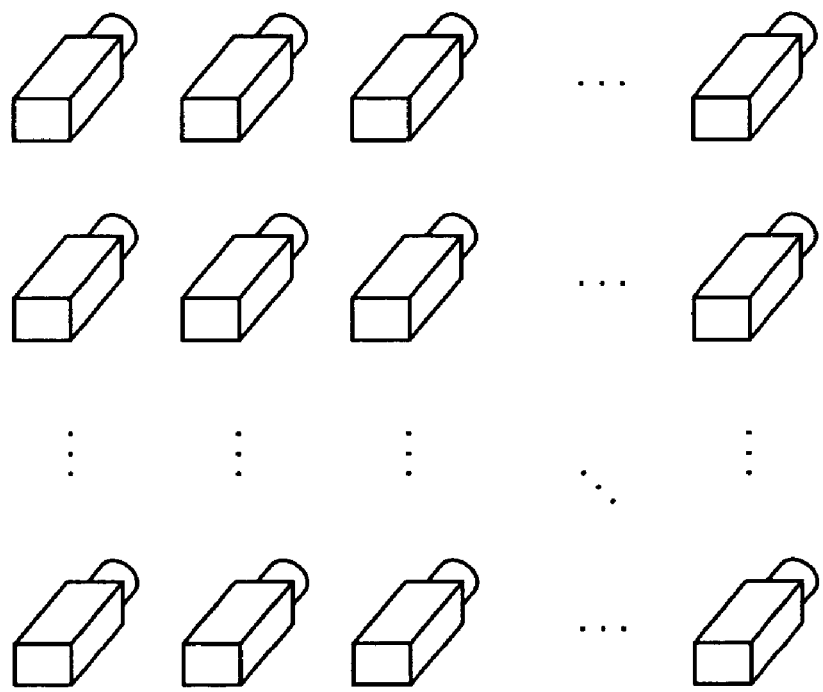
FIG. 32 is a view showing a camera arrangement for acquiring an image.

For this purpose, the process of the first embodiment for setting the angle of view, resolution (pixel number), view point position and orientation of the reconstruction image is so modified that the cone in FIG. 29 is displayed in the photographed image in linkage with the setting of the view point position (cf. FIG. 30). A step S76 displays the photographing range as a cone based on the set position, orientation and angle of view, then a step S77 judges whether the position, orientation and angle of view of the reconstruction image, set up to this point, are appropriate, and the sequence returns to the step S72 if inappropriate but returns to the main routine if appropriate.

By displaying the conical member in a semi-transparent pale color, it is possible to immediately understand a range of displacement within the entire scene. Also by utilizing the output of a position/orientation sensor incorporated in the camera, the dimension of the conical member (range of displacement of the camera) can be obtained as numerical data, which may also be displayed (superposed display or display in another monitor) together with the conical member display whereby the user can recognize the displacement range more specifically.

As explained in the foregoing, the configuration of the present embodiment, which displays a conical member indicating a beam group necessary for setting the view point and numerical data of the displacement range, enables immediate understanding of the camera displacement range, thereby avoiding a setting of an unreasonable view point position and realizing efficient acquisition of the reconstruction image.

Eleventh Embodiment

In the tenth embodiment, the camera displacement range is displayed as a conical member to avoid setting of an unreasonable view point position, and it is additionally possible to avoid a useless camera displacement by giving a warning when the camera is displaced outside such conical member at the photographing operation. Stated differently, since all the beams necessary for the reconstruction are present inside such conical member, a more efficient beam acquisition is possible by limiting the camera displacement within the conical member. The warning can be achieved by displaying a message "outside range" or "error" on the display indicating the scene under photographing or displaying an unphotographed area, or give a voice warning indicating a displacement to the outside of the conical area, or by both at the same time. The warning can be made more effective by a guidance toward the interior of the conical member. For example an arrow toward the interior of the conical member is displayed or a voice message indicating such direction is given. The conical member itself may be displayed or not, but, if displayed, can be utilized as auxiliary information for displaying the unphotographed area. It can also be utilized for displaying the unphotographed area by changing a color in a corresponding portion of the conical member as the acquisition of the beam progresses.

As explained in the foregoing, it is possible to prevent a useless camera displacement and to obtain the beams efficiently, by giving a warning when the camera is moved outside the conical member defined by the view point position, orientation and angle of view of the reconstruction image.

Twelfth Embodiment

The foregoing embodiments have been explained on an assumption that only one view point position for reconstruction exists at a time, but it is also possible to designate plural positions and to execute image reconstructions simultaneously. Also in this case, according to the first embodiment, there are required only one memory for photographing and storing the image and N memories (N being number of view point positions for image reconstruction) for storing the reconstruction images.

More specifically, N reconstruction images can be obtained by setting information for N images by the reconstruction image information setting means 8, determining the beam information of N images by the reconstruction beam information calculation means 9, and applying the process explained in the first embodiment to each reconstruction image. In case of reconstructing plural images of relatively close view point positions, the present embodiment is effective in reducing the image reconstructing time per image, since the beam to be obtained may be common to plural reconstruction images or a photographing operation may obtain beams for plural reconstruction images. Also as to the memory capacity, there is only required an increase of memories corresponding to a number of the reconstruction images, there is not involved a significant cost increase.

In the second embodiment, a similar process is possible by increasing the memory for storing the reconstruction image to N (N being number of view point positions for reconstruction).

As explained in the foregoing, a simultaneous generation of N reconstruction images allows to reduce the reconstruction time per image, and a burden in hardware is limited because there is only required an increase of memories corresponding to a number of the reconstruction images.

(Modifications)

The present invention is applicable to a system formed by plural equipment (for example a host computer, an interface, a reader, a printer etc.) or an apparatus constituted of a single equipment (for example a copying apparatus, a facsimile etc.).

The objects of the present invention can naturally be attained also by supplying a system or an apparatus with a memory medium (or a recording medium) storing program codes of a software realizing the functions of the aforementioned embodiments and reading and executing the program codes stored in the memory medium by a computer (or CPU or MPU) of such system or apparatus.

In such case, the program codes themselves read from the memory medium realize the functions of the aforementioned embodiments, and the memory medium storing such program codes constitutes the present invention. The present invention naturally includes not only a case where the computer executes the read program codes to realize the functions of the aforementioned embodiments but also a case where an operating system (OS) or the like functioning on the computer executes, according to the instructions of such program codes, all the processes or a part thereof thereby realizing the functions of the aforementioned embodiments.

The present invention further includes a case where the program codes read from the memory medium are stored in a memory provided in a function expansion card inserted in the computer or a function expansion unit connected thereto and a CPU or the like provided on such function expansion card or function expansion unit executes, according to the instructions of such program codes, all the processes or a part thereof thereby realizing the functions of the aforementioned embodiments.

In case the present invention is applied to the aforementioned memory medium, such memory medium stores program codes corresponding to the aforementioned flow charts.

The above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An image processing method for reconstructing an image of a view position and orientation from plural photographed images, comprising:
   using an imaging apparatus to perform steps including:
   a setting step of setting the view position and orientation of said reconstructed image;
   a first calculation step of calculating first light beam data of said reconstructed image based on the view position and orientation of said reconstructed image, wherein the first light beam data is data indicating a straight line according to the view position of said reconstructed image and a position of a pixel of the reconstructed image;
   an image pickup step of picking up a photographed image according to the view position and orientation at a time of photographing by using an image pickup unit of the imaging apparatus;
   a second calculation step of calculating second light beam data of the photographed image from the view position and orientation at the time of photographing, wherein the second light beam data is data indicating a straight line according to the view position at the time of photographing and a position of the pixel of the photographed image;
   an extraction step of extracting light beam data corresponding to the first light beam data of said reconstructed image from the second light beam data of the photographed image;
   a generation step of generating said reconstructed image by disposing data of a pixel of the photographed image corresponding to the extracted light beam data in a pixel corresponding to said reconstructed image; and
   a display step of displaying the image which was generated in said generation step and is in the course of reconstruction on a display unit of the imaging apparatus,
   wherein said image pickup step, said second calculation step, and said extraction step are repeated until said reconstructed image is generated, and
   wherein, in the display of said display step, the image which is in the course of reconstruction and a live image which is intended to be picked up in said image pickup step are switchable back and forth,
   wherein a decision is made, based on the display, whether or not to pick up the live image as the photographed image in said image pickup step.

2. An image processing method according to claim 1, wherein said setting step is capable of setting plural view positions and orientations, and plural reconstructed images corresponding to the plural view positions and orientations are generated by using said second calculation step, said extraction step, and said generation step.

3. An image processing method according to claim 1, further comprising a step of informing a generation state of the reconstructed image.

4. An image processing method according to claim 3, wherein said generation state is displaying by a proportion to an entire amount.

5. A computer-readable medium storing a control program for execution by a computer to perform an image processing method for reconstructing an image of a view position and orientation from plural photographed images, said method comprising:
   a setting step of setting the view position and orientation of said reconstructed image;
   a first calculation step of calculating first light beam data of said reconstructed image based on the view position and orientation of said reconstructed image, wherein the first light beam data is data indicating a straight line according to the view position of said reconstructed image and a position of a pixel of the reconstructed image;
   an image pickup step of picking up a photographed image according to the view position and orientation at a time of photographing by using an image pickup unit of the imaging apparatus;
   a second calculation step of calculating second light beam data of the photographed image from the view position and orientation at the time of photographing, wherein the second light beam data is data indicating a straight line according to the view position at the time of photographing and a position of the pixel of the photographed image;
   an extraction step of extracting light beam data corresponding to the first light beam data of said reconstructed image from the second light beam data of the photographed image;
   a generation step of generating said reconstructed image by disposing data of a pixel of the photographed image corresponding to the extracted light beam data in a pixel corresponding to said reconstructed image; and
   a display step of displaying the image which was generated in said generation step and is in the course of reconstruction on a display unit of the imaging apparatus,
   wherein said image pickup step, said second calculation step, and said extraction step are repeated until said reconstructed image is generated, and wherein, in the display of said display step, the image which is in the course of reconstruction and a live image which is intended to be picked up in said image pickup step are switchable back and forth, wherein a decision is made, based on the display, whether or not to pick up the live image as the photographed image in said image pickup step.

6. An imaging apparatus for reconstructing an image of a view position and orientation from plural photographed images, comprising:

a setting unit adapted to set the view position and orientation of said reconstructed image;

a first calculation unit that calculates first light beam data of said reconstructed image based on the view position and orientation of said reconstructed image, wherein the first light beam data is data indicating a straight line according to the view position of said reconstructed image and a position of a pixel of the reconstructed image;

an image pickup unit for picking up photograph images according to the view position and orientation at a time of photographing;

a second calculation unit that calculates second light beam data of the photographed image from the view position and orientation at the time of photographing, wherein the second light beam data is data indicating a straight line according to the view position at the time of photographing and a position of the pixel of the photographed image;

an extraction unit adapted to extract light beam data corresponding to the first light beam data of said reconstructed image from the second light beam data of the photographed image;

a generation unit that generates said reconstructed image by disposing data of a pixel of the photographed image corresponding to the extracted light beam data in a pixel corresponding to said reconstructed image; and a display unit for displaying the image which was generated in said generation step and is in the course of reconstruction, wherein image photographing by said photographing unit, calculation of the light beam data by said second calculation unit, and extraction of necessary light beam data by said extraction unit are repeated until said reconstructed image is generated, and wherein, in the display of said display unit, the image which is in the course of reconstruction and a live image which is intended to be picked up by said image pickup unit are switchable back and forth, wherein a decision is made, based on the display, whether or not to pick up the live image as the photographed image in said image pickup step.

7. An imaging apparatus according to claim 6, wherein said image photographing unit employs a CCD sensor.

8. An imaging apparatus according to claim 6, wherein said image photographing unit employs a CMOS sensor.

* * * * *